US012145835B2

(12) United States Patent
Nini

(10) Patent No.: US 12,145,835 B2
(45) Date of Patent: Nov. 19, 2024

(54) DELIVERING TAP EQUIPPED WITH A SYSTEM FOR PLACING, LOCKING AND ORIENTING THE TAP ON BAG-IN-BOXES

(71) Applicant: VITOP MOULDING S.R.L., Alessandria (IT)

(72) Inventor: Diego Nini, Alessandria (IT)

(73) Assignee: VITOP MOULDING S.R.L., Alessandria (IT)

( * ) Notice: Subject to any disclaimer, the term of this patent is extended or adjusted under 35 U.S.C. 154(b) by 24 days.

(21) Appl. No.: 18/024,108

(22) PCT Filed: Sep. 3, 2021

(86) PCT No.: PCT/IT2021/050272
§ 371 (c)(1),
(2) Date: Mar. 1, 2023

(87) PCT Pub. No.: WO2022/064535
PCT Pub. Date: Mar. 31, 2022

(65) Prior Publication Data

US 2023/0278851 A1 Sep. 7, 2023

(30) Foreign Application Priority Data

Sep. 28, 2020 (IT) ........................ 102020000022789

(51) Int. Cl.
*B67D 3/04* (2006.01)
*B65D 77/06* (2006.01)

(52) U.S. Cl.
CPC ........... *B67D 3/047* (2013.01); *B65D 77/067* (2013.01)

(58) Field of Classification Search
CPC .......... B67D 3/047; B67D 3/04; B67D 3/008; B65D 77/065; B65D 77/067; B65D 2313/00; Y10T 29/49826
See application file for complete search history.

(56) References Cited

U.S. PATENT DOCUMENTS

| | | | | |
|---|---|---|---|---|
| 4,934,654 A * | 6/1990 | Linnemann | B65D 77/065 | 251/95 |
| 5,410,899 A | 5/1995 | McConnell | | |
| 2010/0038386 A1 | 2/2010 | Pritchard | | |
| 2012/0248146 A1* | 10/2012 | Knudsen | B65D 77/067 | 248/314 |

(Continued)

FOREIGN PATENT DOCUMENTS

| | | |
|---|---|---|
| EP | 0884269 A1 | 12/1998 |
| EP | 2261136 A1 | 12/2010 |
| WO | 2006030465 A1 | 3/2006 |

(Continued)

*Primary Examiner* — Vishal Pancholi
*Assistant Examiner* — Robert K Nichols, II
(74) *Attorney, Agent, or Firm* — Flener IP & Business Law; Zareefa B. Flener

(57) ABSTRACT

A dispensing tap (1) is described, including: a support and containment body (2) equipped with an elongated neck (I); a locking ring (3A, 3B) located externally around the elongated neck (I) of the body (2); and a cap (4) inserted inside the elongated neck (I) of the body (2). The body further includes a second central part (II), connected to the elongated neck (I), designed to operatively couple with the locking ring; and a third base zone (III), connected to the second central zone (II).

5 Claims, 30 Drawing Sheets

(56) References Cited

U.S. PATENT DOCUMENTS

| | | | | |
|---|---|---|---|---|
| 2013/0341381 A1* | 12/2013 | Thomason | B65D 25/28 229/117.09 |
| 2023/0166963 A1* | 6/2023 | Hagerty | B67D 3/0067 222/94 |

FOREIGN PATENT DOCUMENTS

| | | | |
|---|---|---|---|
| WO | 2010069340 | A1 | 6/2010 |
| WO | 2011054356 | A1 | 5/2011 |

* cited by examiner

DELIVERING TAP EQUIPPED WITH A SYSTEM FOR PLACING, LOCKING AND ORIENTING THE TAP ON BAG-IN-BOXES

The present invention relates to a tap for dispensing liquids from containers, in particular and preferably from so-called "bag-in-box" (hereinafter referred to as BIB) containers. In particular, the present invention refers, in a non-limiting way, to dispensing taps, preferably for BIB systems, with an opening that allows the delivery of fluids contained within the container.

The tap 1 must have integrated, stably and immovably, to the main body 2 of FIG. 20 a new component 3A/3B shown in FIGS. 21 and 22 (the component 3A are to be used on lines that lock manually, with the aid of a human intervention, while the component 3B are to be used on automatic lines) which allow, thanks also to the new conformation of the main body 2 of the inventive tap 1 provided with anchoring geometries 2.1 (shown in FIG. 20) and rotation guide geometries 2.2 (shown in FIG. 20), to be stably anchored to the cardboard box 7 of FIG. 27 of the BIB, allowing the dispenser tap 1 to be in the "ready to use" position stably constrained and able to compensate all external forces that intervene during placement and use, and therefore no longer require the end customer to position the tap manually and keep it in position before proceeding to the liquid supply, also ensuring that the forces applied to the tap 1 to open it are compensated by the new geometries obtained on the body of the tap and on the new component (hereinafter called locking ring (LCKR) 3A/3B) and from the geometry of the positioning hole 6A of FIG. 23 of the tap 1 obtained on the cardboard box of the BIB.

Object of the present invention is replacing the technologies for locking, orienting and/or positioning the dispensing tap with an innovative technology which complies with the new European and international directives on disposable plastic articles (SUP).

Furthermore, the system has to adapt perfectly to the box and to the system object of patent n. EP-A1-3632813, in the name of The Procter & Gamble Company, optimizing it and making it more economical and eco-friendly.

In particular, the LCKR 3A/3B faucet must be designed to meet the requirements of the new European regulation called "Disposable Plastic" (SUP), recently adopted by the European Parliament on Mar. 27, 2020, as well as, for example, the AB 319 California regulation in United States. Both regulations aim to increase the amount of plastic collected and recycled, thereby reducing marine litter. As a result, CPGs (consumer packaged goods companies) have called on their partners to develop solutions that not only comply with new regulations, but also provide environmentally conscious consumers with solutions that fit their lifestyle and provide them with the best packaging experience.

Referring to these new needs of the market, the Applicant has developed a new dispensing tap that solves the innumerable problems of the locking systems of the dispensers on the market, preferably from BIB systems, which to date would not be able to satisfy the new requirements from the new European and international directives on disposable plastic items (SUP) because they are very expensive "apart" plastic pieces that use a large amount of plastic, as they are, among other things, other, geometrically very large components, since they must be able to bind themselves to particular boxes (with high resistance) and must be able to compensate for the mechanical stresses that are created in the final use phase.

In particular, the invention can be considered, in a non-limiting way because in any case the concept can also be used for other dispensers of the Applicant with appropriate geometric modifications, an innovation of the tap disclosed in International patent application WO-A1-2006030465, in the name of the same Applicant, who can be considered the progenitor, and relates to a dispensing tap made entirely of plastic material, adaptable to existing connection systems on the market, equipped with a cam opening system and an anti-drop "cutting flow" system already highlighted in this patent.

The characteristics already described in detail in patent WO-A1-2006030465 will not be described here, as they are already known, but we will focus on the new improved conformation of the tap of the present invention.

The prerogative of the present invention is to create a dispensing tap 1 which allows to be stably connected and fixed to the BIB box thanks to an additional LCKR 3A/3B component, bound to the main body 2 of the tap 1, thus creating a single dispensing tap element 1.

The LCKR 3A/3B of FIGS. 21 and 22 has all geometries and necessary devices to anchor and compensate for all external stresses, thanks to the coupling with the hole created ad hoc on the box 7 highlighted in FIG. 23.

Another fundamental prerogative is that the tap 1 according to the present invention must be made entirely of plastic material (therefore easily recyclable) and with simple geometries to be produced with traditional injection molding, so as to reduce its production costs.

The prerogative of the present invention is to design every single component that is part of the tap 1 so that the least amount of plastic material possible is used, and therefore emphasizing the aspect concerning environmental protection as well as the best and most economical production of the same, thanks to the creation of "drains" of material around the various geometries of the components.

Various solutions are known on the market which allow the tap to be anchored to the BIB box during the packaging production phase, which however are complex and expensive to produce. These solutions are "additional components" in their own right with respect to the standard BIB system, which normally consists of three macro components, namely a cardboard box, an internal plastic bag (equipped with a nozzle for connecting the dispensing tap welded to the bag itself) and a dispensing tap): these solutions, therefore, allow making the four-component system (the three previously listed+a spacer) which, in addition to not being compliant with the level of new European directives in terms of disposable plastic (SUP), are special parts, difficult to produce and which increase the total cost of the final BIB, significantly affecting the manufacturing and packaging process because standard technologies for the BIB cannot be used.

Furthermore, these solutions require the use of special cardboard boxes (with greater strength in order to withstand mechanical stress during use) which make the product become a special niche production to be managed separately from all the rest of the "BIB world"; moreover, compared to the boxes normally used in the BIB world, they are much more expensive.

Furthermore, the solutions currently on the market are difficult to automate and therefore require the intervention of a human being (further increase in the production cost).

Furthermore, they require special filling systems that make it necessary to specifically dedicate a packaging machine (in the packaging production phase) and filling (in the packaging phase of the product to be dispensed later) only and exclusively for this additional system.

The major manufacturers of locking and positioning systems for dispensing taps on cardboard boxes for the BIB market are: Scholle IPN and DS Smith Corrugated Packaging Ltd.

In particular, for example, the company Scholle IPN has created and patented a system that provides for the insertion of this fastening system (which will be referred to hereinafter as spacer) before filling and also provides that the bag, in which the liquid to be dispensed is inserted, is folded and fixed by means of a paper band (with glue or adhesive tape), to the spacer fixing system.

The assembly is then placed and anchored stably on the cardboard box (highly resistant and therefore much more expensive than a normal box used in the BIB world) and the bag is only filled later.

The thrust of the liquid breaks the paper band that holds the bag folded and allows the bag to be unfolded inside the boxes, favoring filling.

The above is shown in a clear and detailed manner in the patents indicated below owned by company Scholle IPN: WO-A3-2011011178, WO-A8-2011011178, AR-A1-077304, AU-A1-2010274239, AU-B2-2010274239, BR-A2-112012001127, CA-A1-2767778, CL-A1-2012000167, CN-A-102639405, CN-B-102639405, EP-A2-2456686, EP-A4-2456686, EP-B1-2456686, JP-A-2012533486, KR-A-20120083288, MX-A-2012000950, NZ-A-598182, RU-A-2012105979, RU-C2-2544142 and US-A1-2012205396.

In this case, it will be easy to notice the extreme complexity of the system and above all the multiplicity of materials used (additional plastic given by the added spacer component and paper band that are used to keep the bag folded overall).

Furthermore, the preparation of the system requires a considerable investment of time and money: in fact. it is very different from the BIB system which is based on simple systems such as tap+bag+cardboard box.

Another known and patented system is the one supplied by DS Smith Corrugated Packaging LTD. This system is not shown in detail either, since it is known and present in patent EP-A1-2631196. In this case, it is a system applied to large-sized BIBs but the concept could also be applied to standard-sized BIBs.

In this case, the plate even consists of two heavy components that allow a stable anchoring on the cardboard box, increasing the production cost even more and deviating even more from the new European directives in terms of disposable plastic (SUP).

Both solutions described above remain permanently bound to the box and are difficult to separate, thus not favoring its correct recycling.

The main object of the present invention is creating an integrated system that complies with the new European directives in terms of single-use plastics (SUP), which is easy to produce and which has a minimal impact on the production cost, and which above all does not require the use of a special cardboard (high strength) but allows the use of a standard box for BIB, and also does not increase the number of components of the BIB system, by not using the spacer described above. Furthermore, the new dispensing tap with spacing, positioning and/or locking system has to be adapted to existing filling systems, not requiring modifications or special lines designed ad hoc.

In addition, the new dispensing tap must be automatable (therefore the locking of the tap 3A on the BIB box can be done with human intervention by an operator, or, in the 3B version, with the intervention of a machine, and therefore automated).

Last, but not least, the tap 1 has been designed to perfectly fit the BIB box developed for e-commerce, designed and patented by Procter & Gamble (P&G) company with patents: EP-A1-3632813, EP-A1-3632814, EP-A1-3632815, US-A1-2020108993, US-A1-2020108995, WO-A1-2020072562, WO-A1-2020072563, WO-A1-2020072565 and US-A1-2020108994.

This box 7 (shown in FIG. 27) uses the dispenser tap 8 (shown in FIGS. 25 and 26) of the Applicant (patent WO-A1-2006030465) and a spacer 6 (FIG. 29) adapted to block the same on the flap 7B of FIGS. 25, 26 and 28 which is a single piece of the movable inner box 7.

This solution was created in order to solve the problems that the standard BIB normally has, namely that currently, according to company P&G, the BIB containers found on the mass market are inconvenient for consumers to use.

First of all, referring to the four explanatory images in FIG. 24, the consumer removes a tear-off tab (image 1 of FIG. 24) designed in a primitive way to create an opening in the BIB container to allow the end customer to recover the tap dispenser from inside the container (image 2 of FIG. 24). Typically, the bag in the BIB container is simply stuffed into the container and the tap dispenser is in a retracted position between the folds of the bag and it is difficult for the consumer to find, grasp and extend the container. Then he must position it, usually in the hole created to be able to withdraw the dispenser exposed a little while ago (image 3 of FIG. 24) and subsequently, according to the type of dispenser present, the seal is opened and the fluid dispensed (image 4 of FIG. 24).

With these limitations in mind, there is a continuing unresolved need for a BIB container that provides convenient dispenser placement. There is a further continuing unaddressed need for a BIB container for which the tap dispenser can be easily positioned.

The study of this special box designed specifically for e-commerce provides that a container 7 (FIG. 27) is created which, when closed, is a standard-sized BIB, while when removing the pre-punched wall 7A of FIG. 28, usually present on the smaller side face of the BIB (visible after the thermal moisture protection sleeve has been removed), allows to free a large opening that allows the movable inner cardboard flap 7B (FIG. 28), on which the dispensing tap 8 is constrained thanks to a detail called spacer 6 (FIGS. 28 and 29), to get into the correct dispensing position thanks to the thrust of the full internal bag. The spacer 6 of FIG. 29 is an additional component made in a ring and with the necessary geometries to anchor/fit stably to the tap 8 of FIG. 25.

Nowadays, it is placed manually (FIG. 25), inserting it from above and fitting it onto the tap 8 (FIG. 26) by a human operator who allows the tap to be fastened to the internal movable flap 7B of FIG. 26 of the box 7. After removing the pre-punched wall 7A of FIG. 27 the flap, which is folded inside the box 7, and consequently the dispensing tap 8 bound to it by the spacer 6, comes out (FIG. 28), is pushed out by its own weight of the full fluid bag contained inside the box 7 of FIG. 27 and is positioned in an "automatic" way immediately in the right position without (or almost without) the intervention of the final customer.

Currently, the standard tap 8 of FIGS. 25 and 26 of the Applicant is placed and sold on the box 7, which opens and allows the delivery of the fluid contained inside the BIB by unscrewing the front cap. This tap is constrained to the internal flap of the box thanks to the additional spacer 6 component, which requires manual intervention by a human operator, as shown in FIGS. 25 and 26, with the insertion of the piece after filling the BIB bag.

This component has the purpose of binding the cap to the internal flap 7B of FIG. 28 of the special cardboard box 7 of FIG. 27 so that, when the end user receives the box and removes the external plastic sleeve useful for protecting the cardboard from humidity, it also removes the cardboard front part 7A of the pre-punched box, and the same internal flap 7B, due to the effect of its own weight given by the full internal bag, moves forward "to exit" and position "automatically" the tap in dispensing position without the intervention of the end customer: in practice, this special box is shaped so that, once the protections are removed, the tap (bound to the internal cardboard flap thanks to the additional spacer 6) is in a ready-to-use position.

The main purpose of our new dispenser tap is to find a valid alternative to the spacer 6 used today by company P&G, so that it can be replaced and eliminated, as it is not very advantageous in all its aspects, as well as absolutely inefficient. The problem of the current spacer 6 is that it is provided with all the useful geometries to anchor the tap to the movable flap of the box 7 (7B of FIGS. 25 and 26) but, once the opening and positioning of the dispenser tap in the ready-to-use position highlighted in FIGS. 27 and 28, it has no geometry that compensates for the rotation movement required to open the tap cap 8 of FIG. 28, and therefore this rotates freely without any limitation, having serious consequences regarding its correct use.

In fact, the rotation of the dispenser does not allow for a liquid outlet flow perpendicular to the support surface of the BIB.

Consequently, it could "deceive" the final customer who, not realizing it, would direct the flow of liquid in different directions with respect to those established if the dispenser tap 8 were stopped in the right position.

Furthermore, the spacer 6 is a piece in its own right, which, once the life cycle of the BIB is over, could be lost and dispersed in the environment, not allowing its proper recycling.

Furthermore, the spacer 6 is a large component with high wall thicknesses (therefore with a lot of plastic used) which increases the level of pollution and above all it increases the production cost of the packaging, making it not very convenient.

The amount of plastic used for the spacer 6 has a strong impact at production level, also because this cannot be automated, but must always require the intervention of a human operator for its placement.

All details of the geometry that allows this automatic movement are highlighted in the P&G patent mentioned above.

In the present invention, a particular tap has been developed which allows to always use the Applicant's technology (WO-A1-2006030465) and also use the P&G box 7 of FIG. 27, but eliminates the external spacer element 6 of FIG. 29, thus conforming the packaging of the box 7 to the European directives in terms of disposable plastic (SUP), and above all making it possible to have a dispensing tap 1 stably placed on the cardboard box, oriented correctly and with the right geometries suitable to counteract the external forces that the old spacer 6 could not provide.

Furthermore, the packaging is made divisible at the end of its life with all the pieces bound together: plastic with plastic (bag+dispenser tap with integrated spacer) and cardboard with cardboard (BIB box), without the use of glues or adhesive tapes that increase the level of pollution and non-recyclability of packaging at the end of its life.

Furthermore, all above-mentioned problems are be solved, requiring no complicated modifications to any entity involved in the process (it is only necessary to modify the outlet hole of the tap from the current circular conformation 7B.1 of FIG. 30 to the new conformation 7A.1 of FIG. 23, which has such a conformation as to allow it to be anchored to the new geometries present on the main body 2 of FIG. 20, and compensates for its rotation during the opening phase of the tap 1).

The new tap is able to adapt very well to the aforementioned box 7, but also to replace the outdated concepts of the Scholle IPN and DS Smith Corrugated Packaging LTD patents, as well as of course to adapt to any type of BIB box that wants to take advantage of the concept of ready-to-use dispensers.

The main problem of the P&G patented system is that, by using a tap with rotation opening like the one supplied to the P&G company, the spacer 6 is able to keep the tap in position as regards the placement on the movable internal fin (integrated with the rest of the box 7 and obtained through a special folding) of the cardboard box 7 (therefore the tap remains bound to the internal flap of the box 7) and therefore does not allow the cap to collapse inside the box: indeed, being bound to the movable flap 7B of FIG. 28, it performs the movement that allows it to automatically go into the ready-to-use position as shown in FIG. 28, but is not able to compensate for the rotation movement imposed by the end user on the tap 8 of FIG. 28 during its opening (and closing) phase to proceed with the delivery of the fluid, as it has no constraints that oppose the rotation.

This generates a rotation of the entire spacer 6 system+dispensing tap 8 (both when opening and closing the dispensing tap 8) which can only be solved thanks to the intervention of the second hand which keeps the rotation of the whole system blocked during the opening, or, if one does not intervene with the second hand, the tap rotates and positions the outlet hole of the liquid in an "oblique" position, not perpendicular to the support surface as it should be.

The aforementioned and other objects and advantages of the invention, which appear from the following description, are achieved with a dispensing tap as claimed in claim 1. Preferred embodiments and non-trivial variants of the present invention are the subject matter of the dependent claims.

It is understood that all attached claims form an integral part of the present description.

It will be immediately obvious that numerous variations and modifications (for example relating to shape, dimensions, arrangements and parts with equivalent functionality) can be made to what is described, without departing from the scope of the invention as appears from the attached claims.

The present invention will be better described by some preferred embodiments thereof, provided by way of non-limiting example, with reference to the attached drawings, in which.

Figure 24:
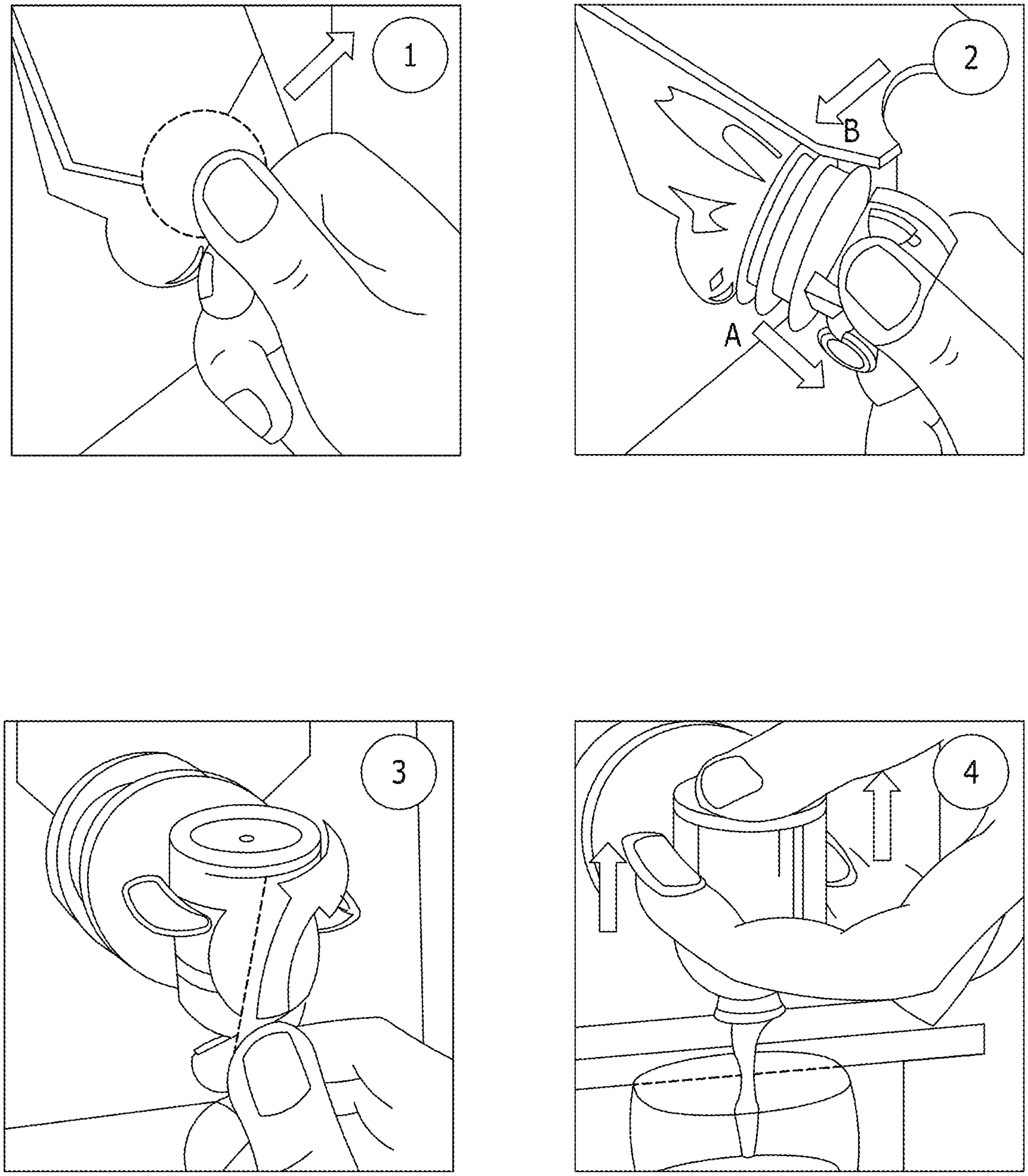
Figure 25:
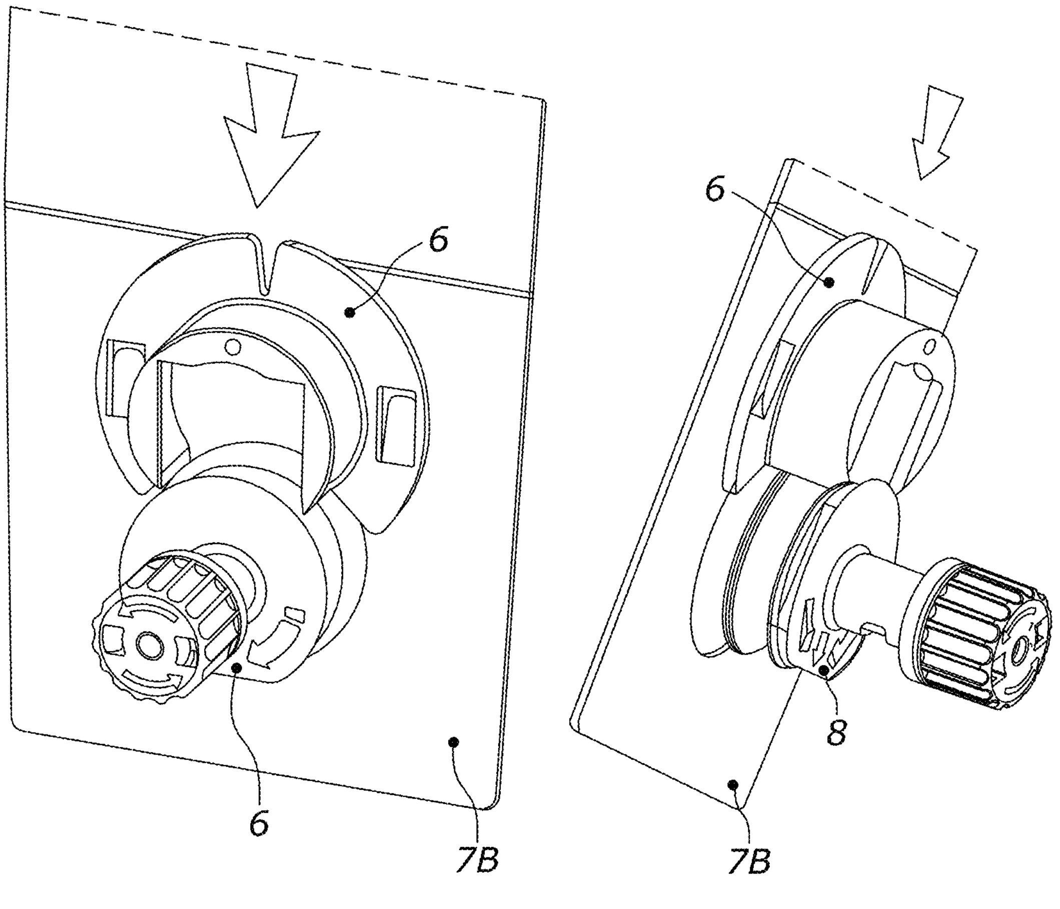
Figure 26:
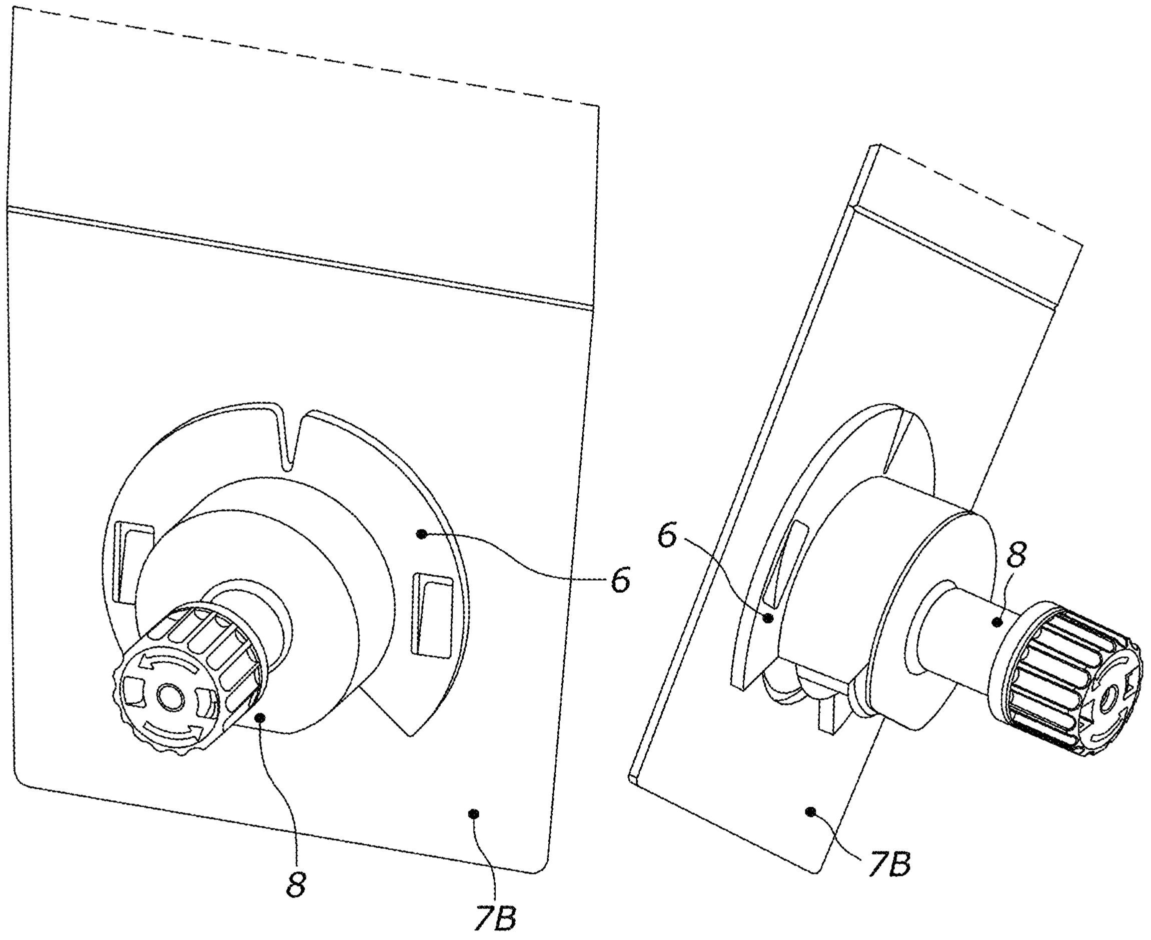
Figure 27:
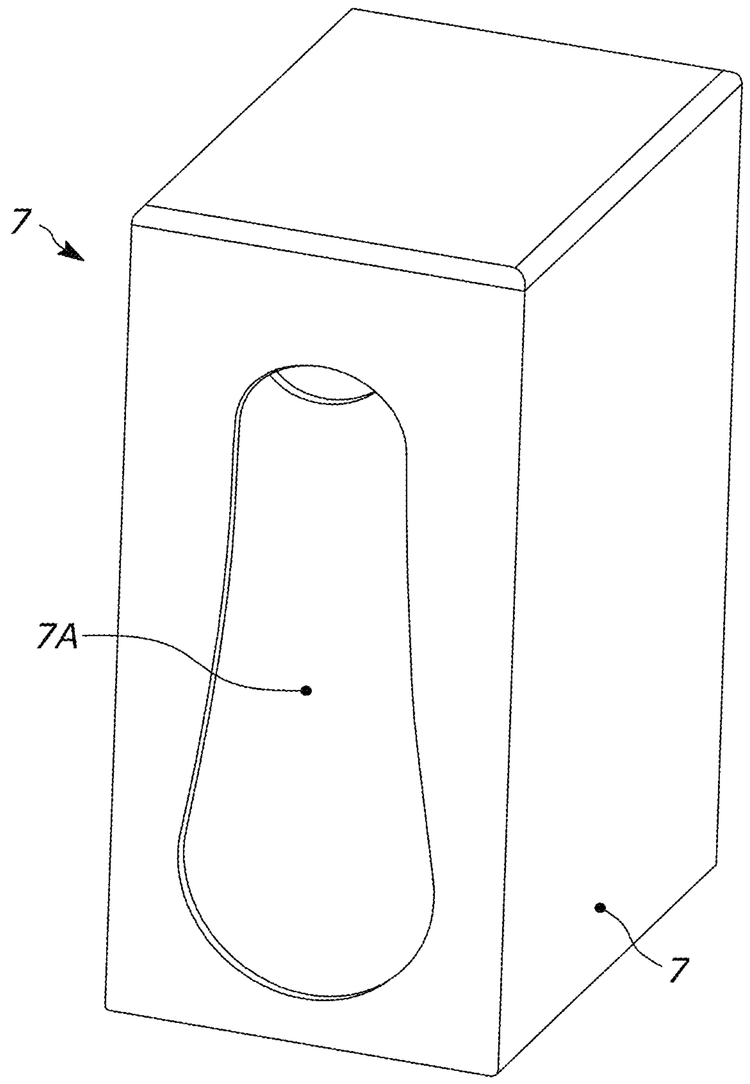
Figure 28:
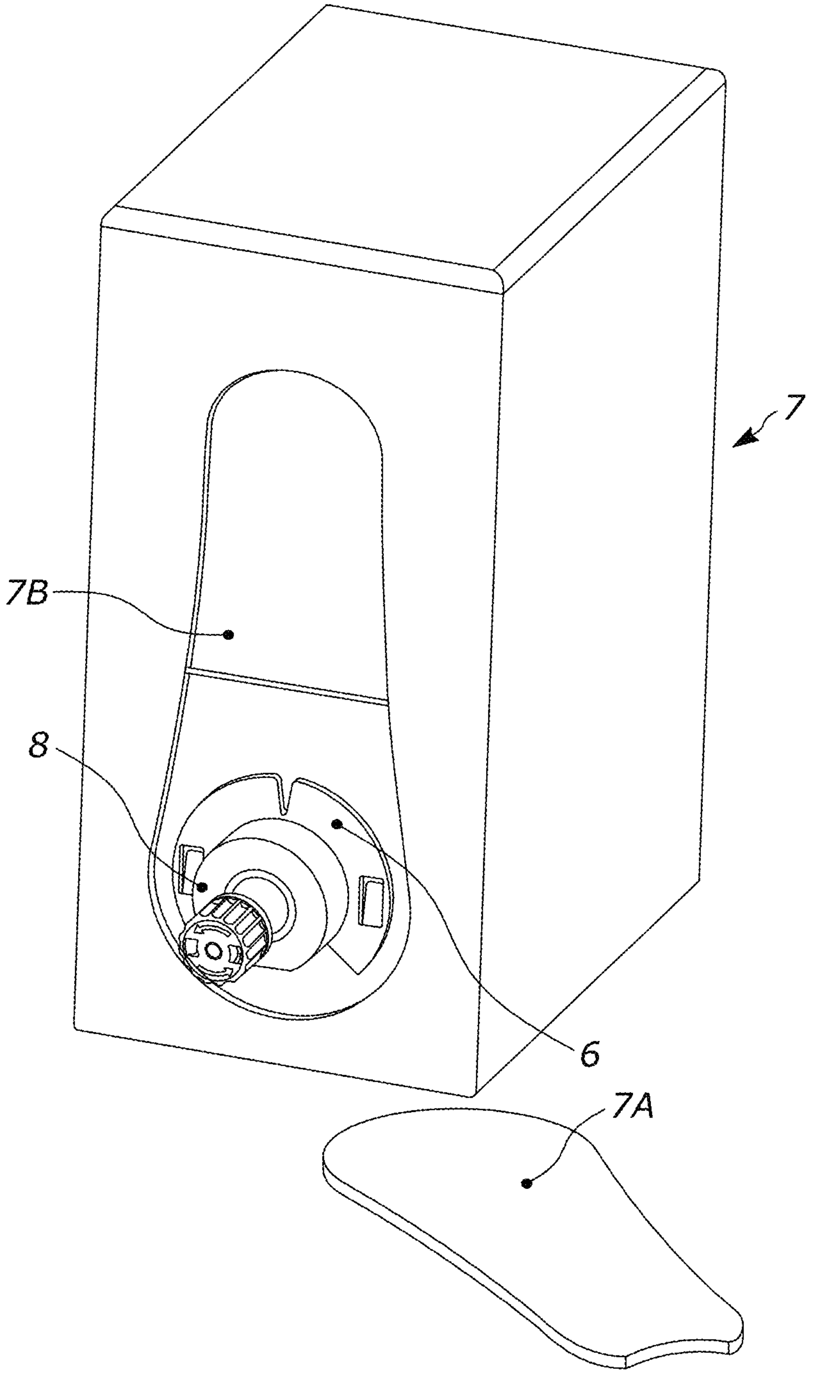
Figure 29:
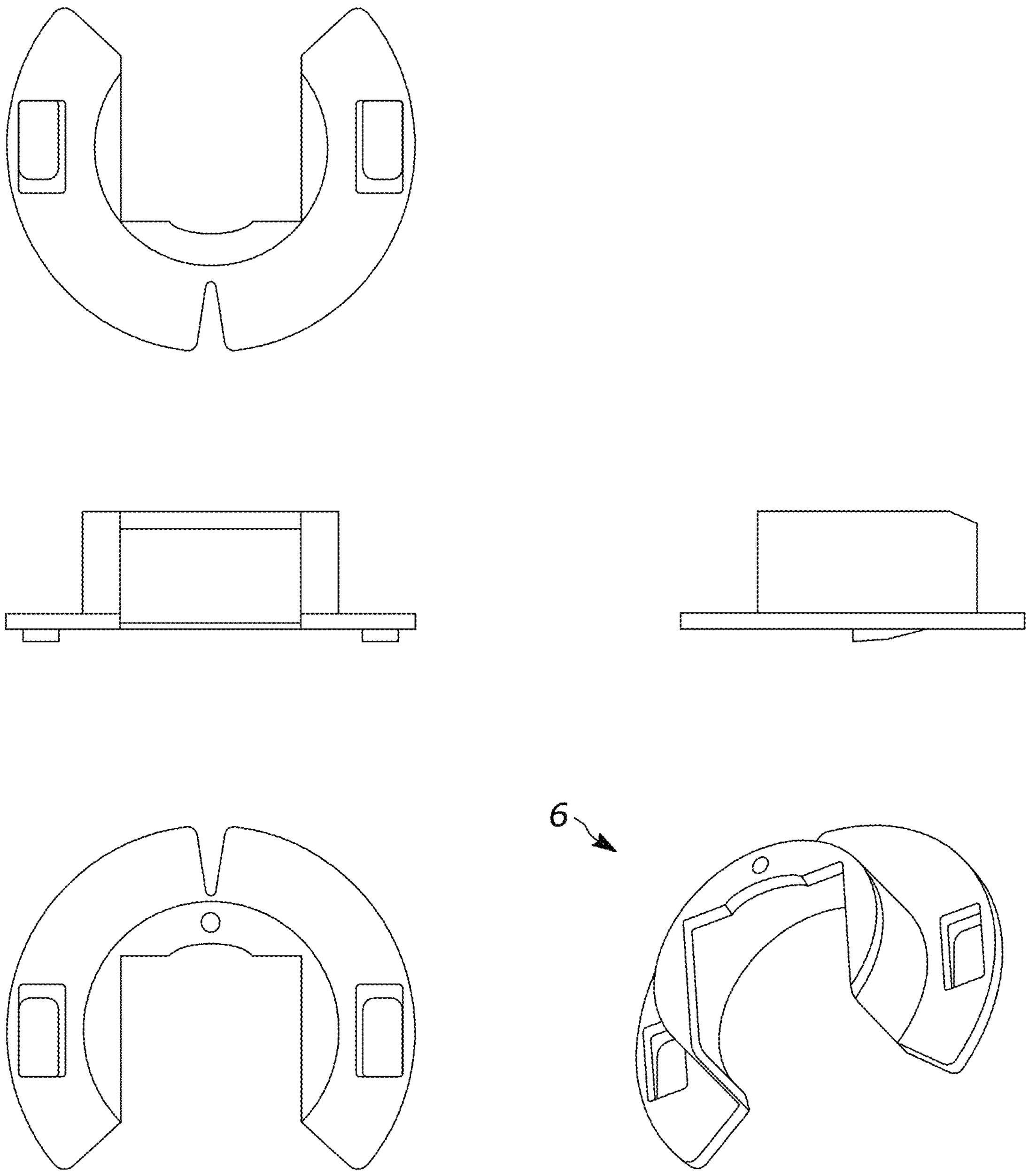

FIG. 24 contains four images that illustrate how today the dispensing tap is protected, extracted and placed in the world of BIBs;

FIG. 25 contains two isometric views which illustrate how today the P&G company places and blocks the Applicant's tap 8 with the spacer 6 in the initial position;

FIG. 26 contains two isometric views which illustrate how today the P&G company places and blocks the Applicant's tap 8 with the spacer 6 in the final position;

FIG. 27 is an isometric view of the box 7 in the closed position;

FIG. 28 is an isometric view of the box 7 in the open position ready for use;

FIG. 29 is a front, side and isometric view of the spacer used; and

Figure 30:
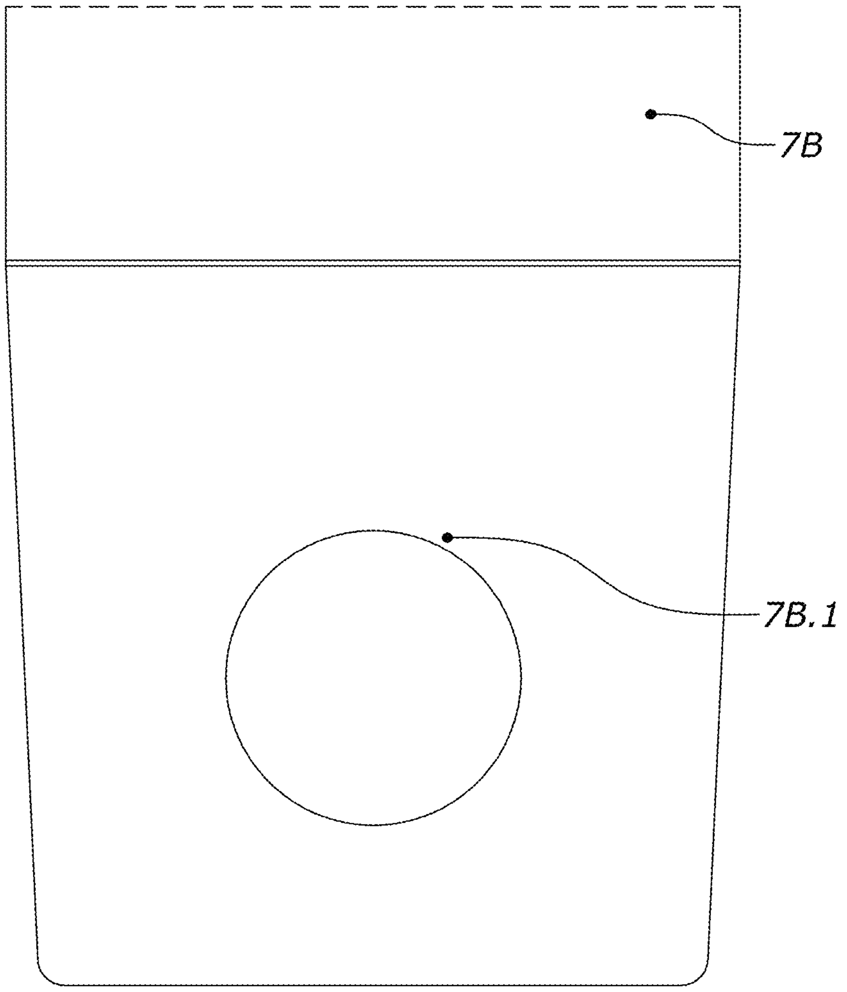

FIG. 30 is a front view of the circular hole of the box 7.

With reference to the Figures, an exemplary and non-limiting embodiment of the dispensing tap 1 of the present invention is described.

It will be evident to an expert in the art that the tap described can be made in shapes, sizes and with equivalent details, and can be used for containers of various types, for example those so-called "Bag-in-Box" (BIB), but also those of rigid or semi-rigid type or others.

Figure 1:
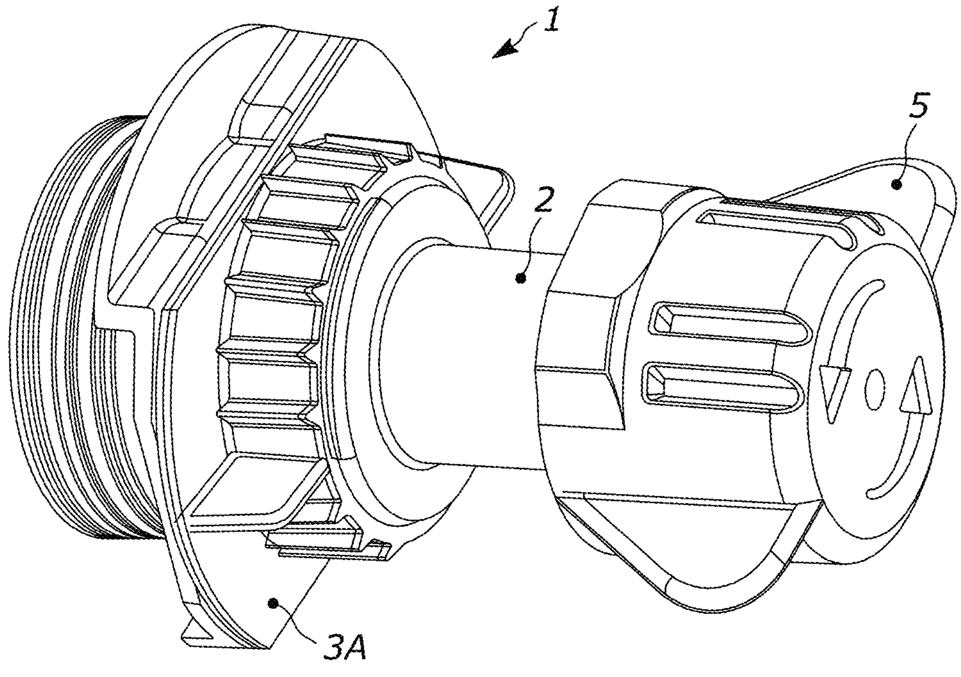
FIG. 1 is a perspective view of an embodiment of the tap 1 according to the present invention in the closed position with the locking ring LCKR 3A "not activated"
Figure 11:
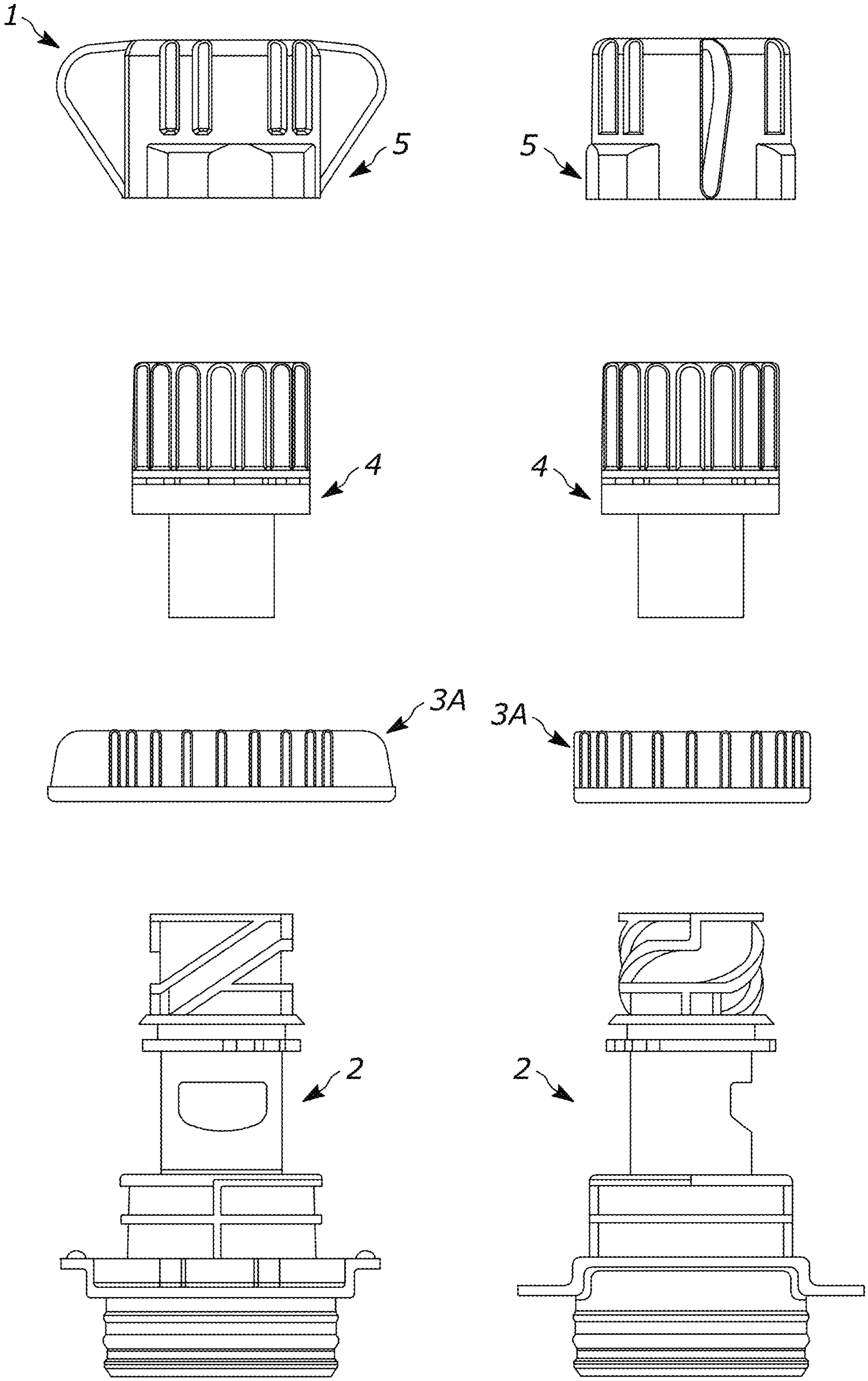
FIG. 11 is an exploded view of an embodiment of the tap 1 according to the present invention in conformation for manual lines.
Figure 14:
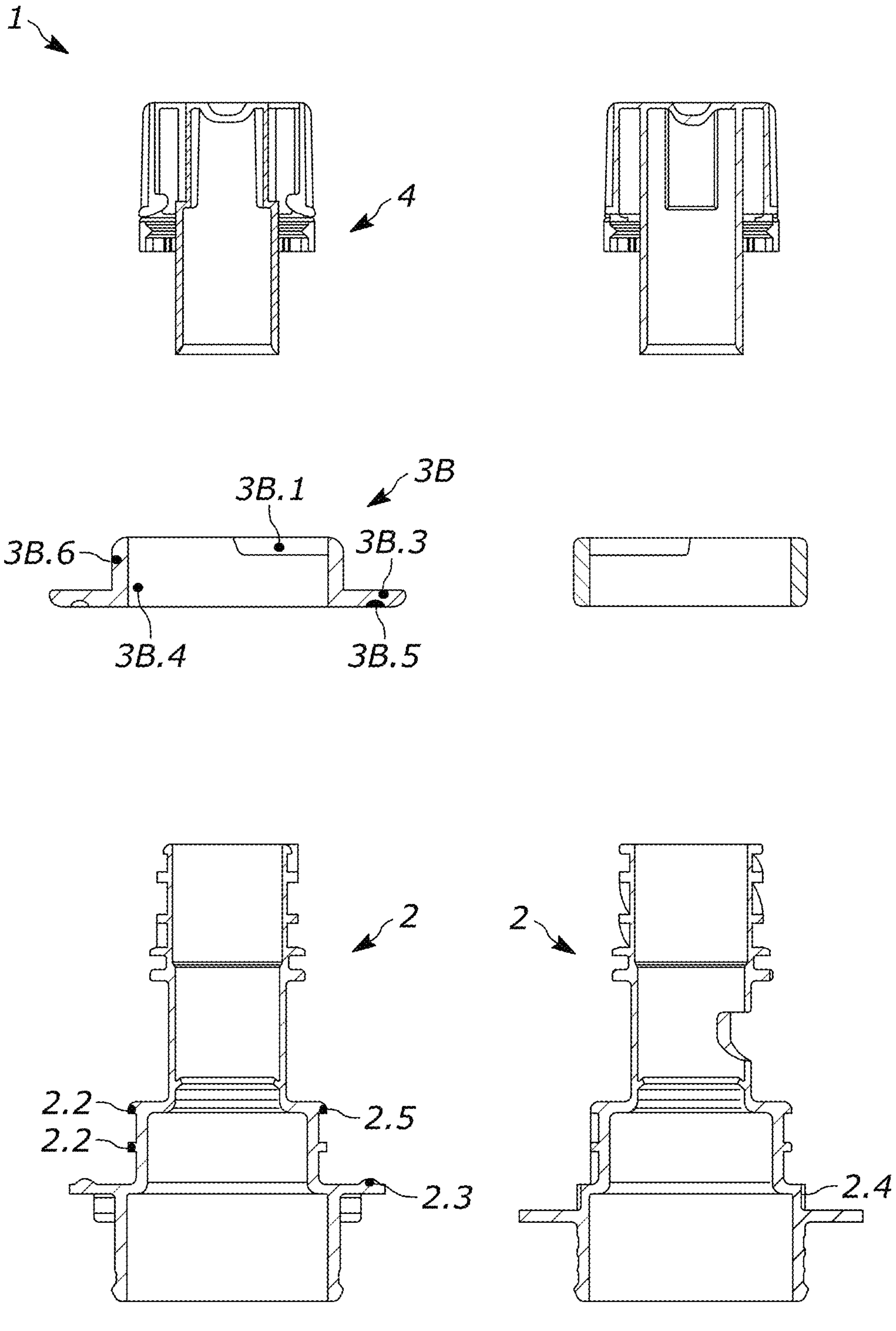
FIG. 14 is an exploded sectional view of an embodiment of the tap 1 according to the present invention in conformation for automatic lines.
Figure 15:
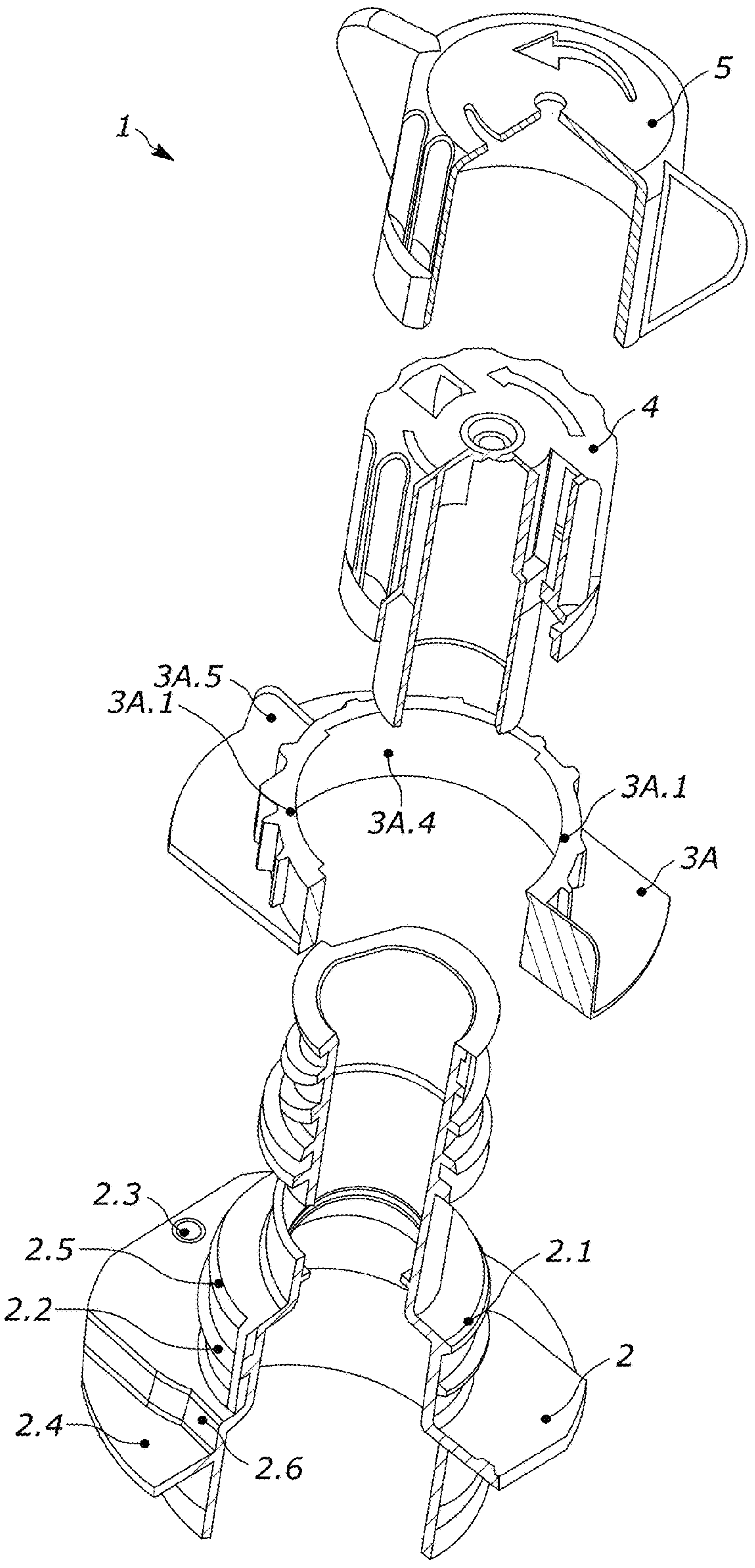
FIG. 15 is an isometric exploded sectional view of an embodiment of the tap 1 according to the present invention in conformation for manual lines.
Figure 16:
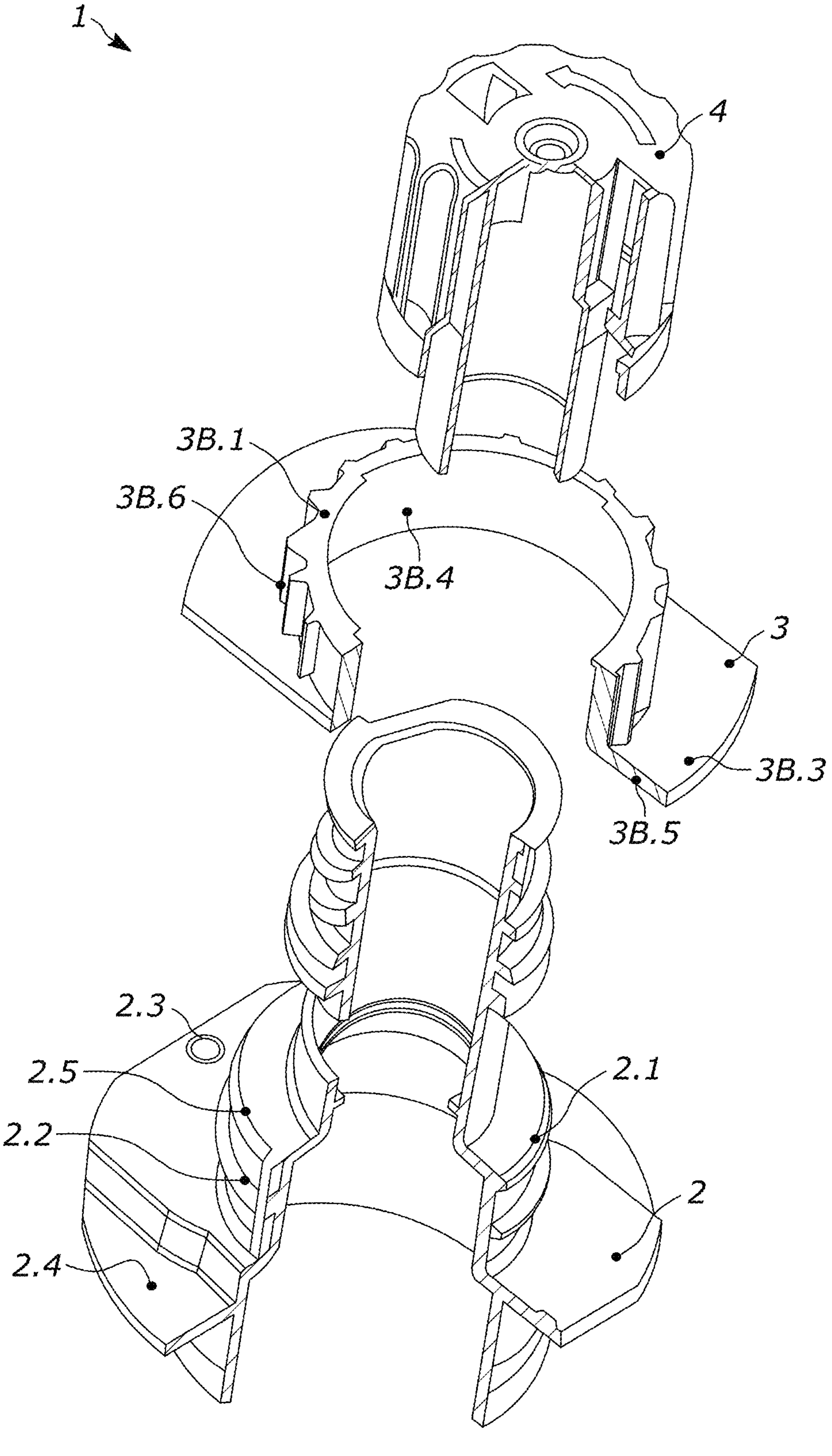
FIG. 16 is an isometric exploded sectional view of an embodiment of the tap 1 according to the present invention in conformation for automatic lines.

A first embodiment of the tap 1 of the invention is shown in FIG. 1, and uses the body 2 of FIG. 14, which is then coupled with the new locking ring component LCKR 3A and with a cap 4 and a cap 5 of FIG. 11, forming the version for manual placement on the inventive box 7 of FIG. 27.

Figure 2:
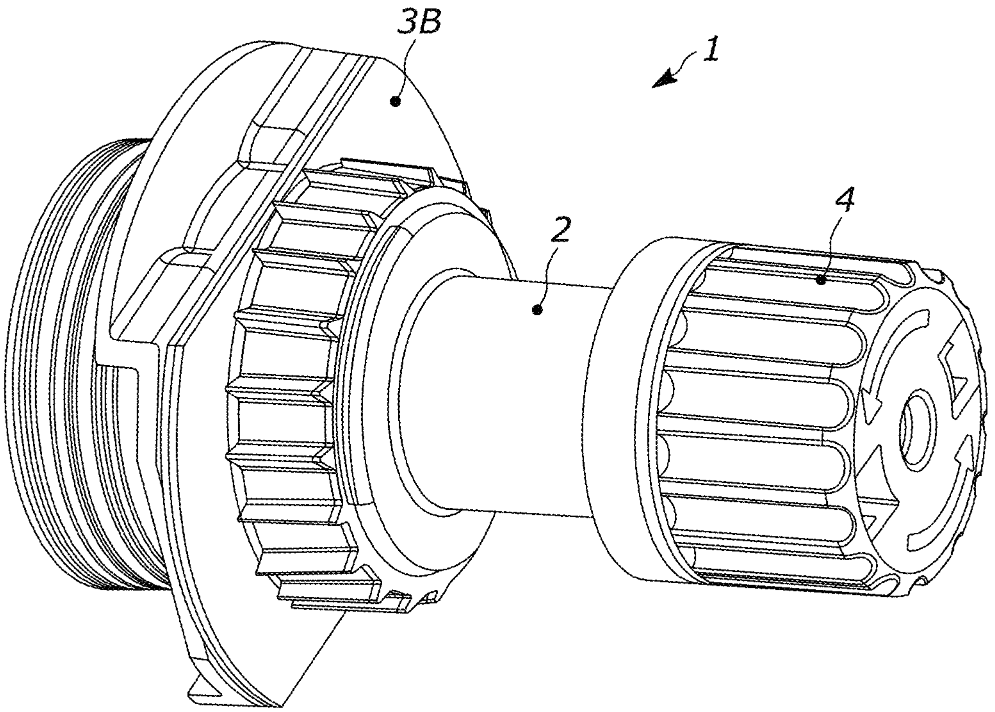
FIG. 2 is a perspective view of an embodiment of the tap 1 according to the present invention in the closed position with the locking ring LCKR 3B for use on automatic lines "not activated"
Figure 12:
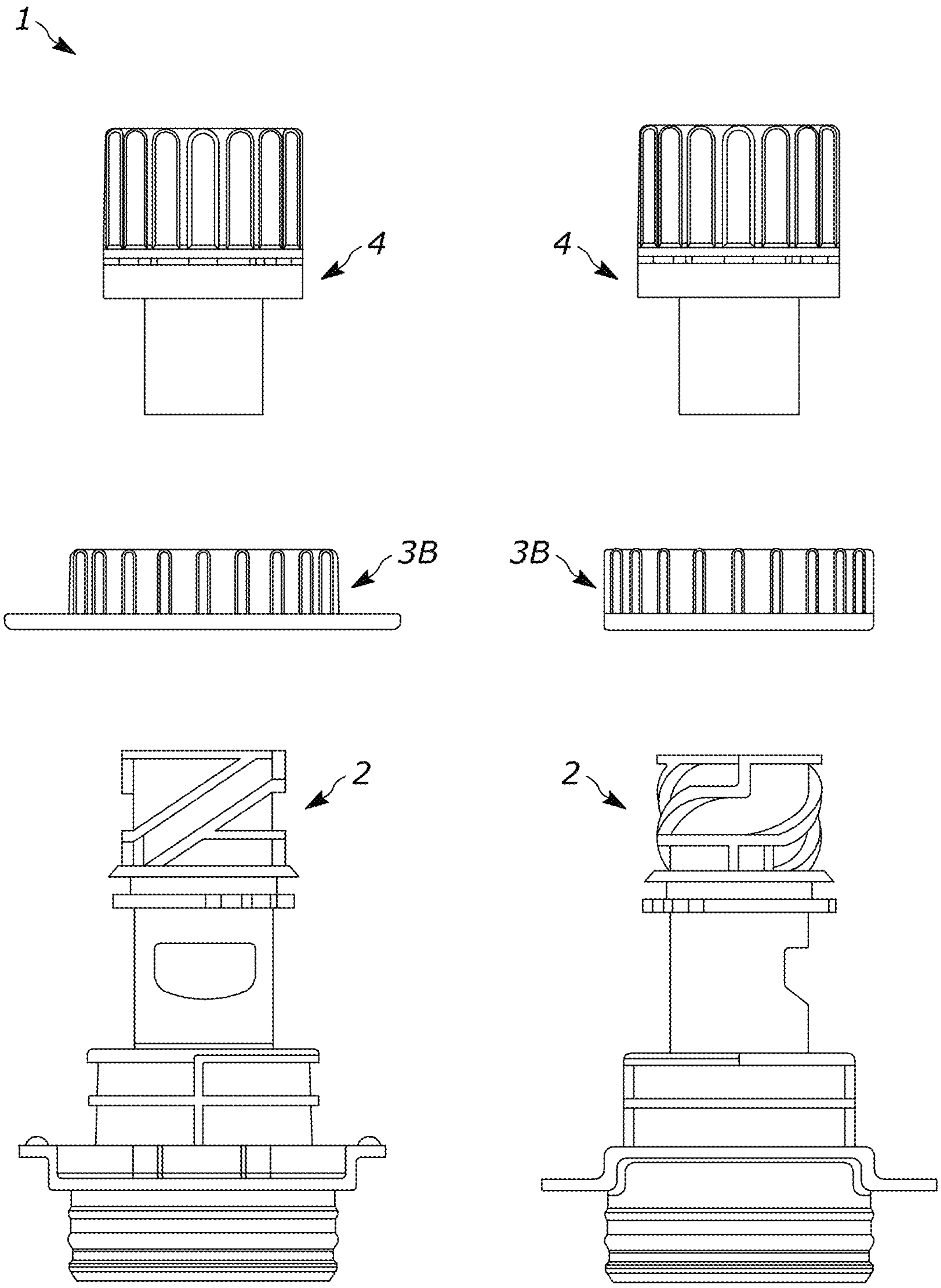
FIG. 12 is an exploded view of an embodiment of the tap 1 according to the present invention in conformation for automatic lines.
Figure 13:
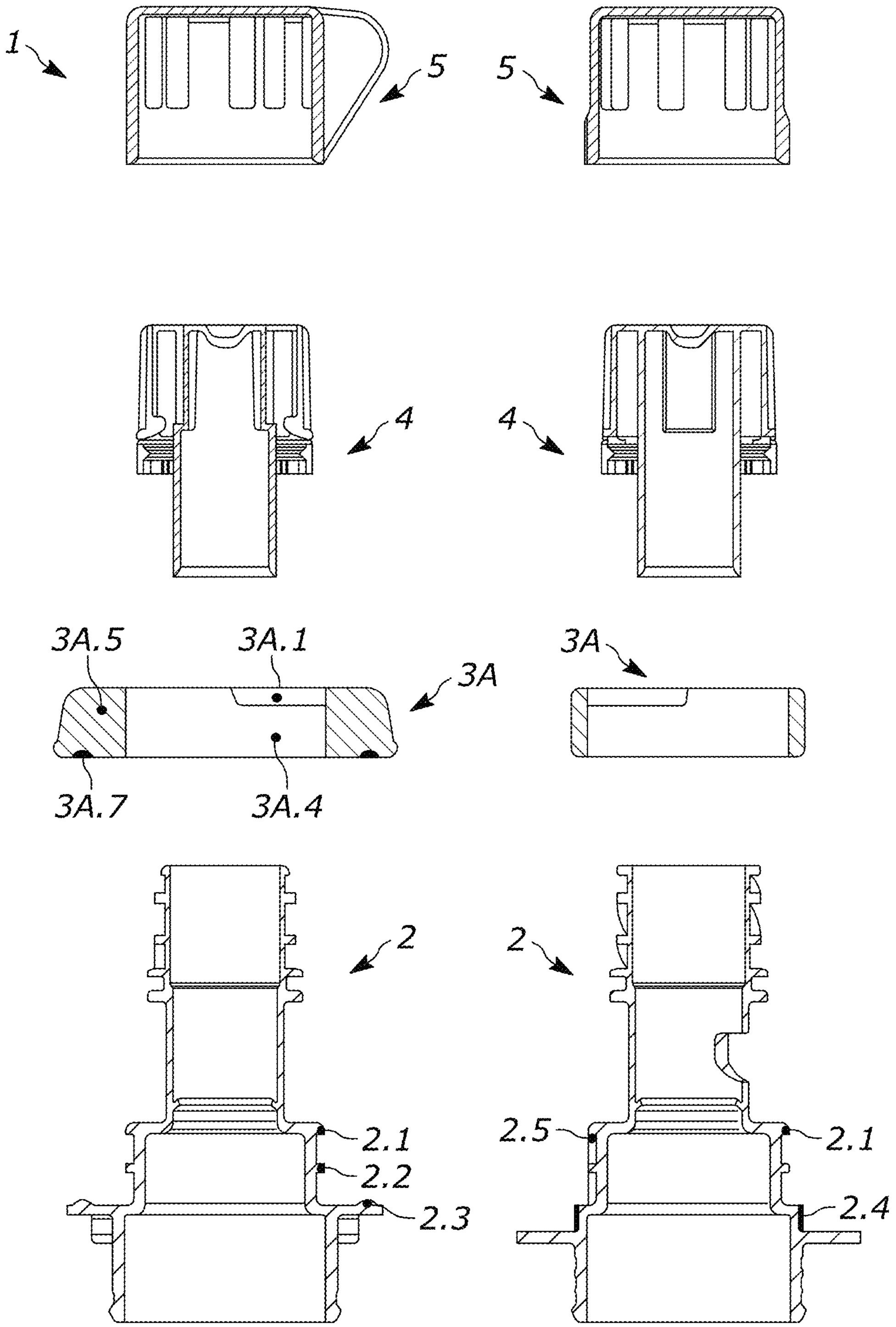
FIG. 13 is an exploded sectional view of an embodiment of the tap 1 according to the present invention in conformation for manual lines.
Figure 20:
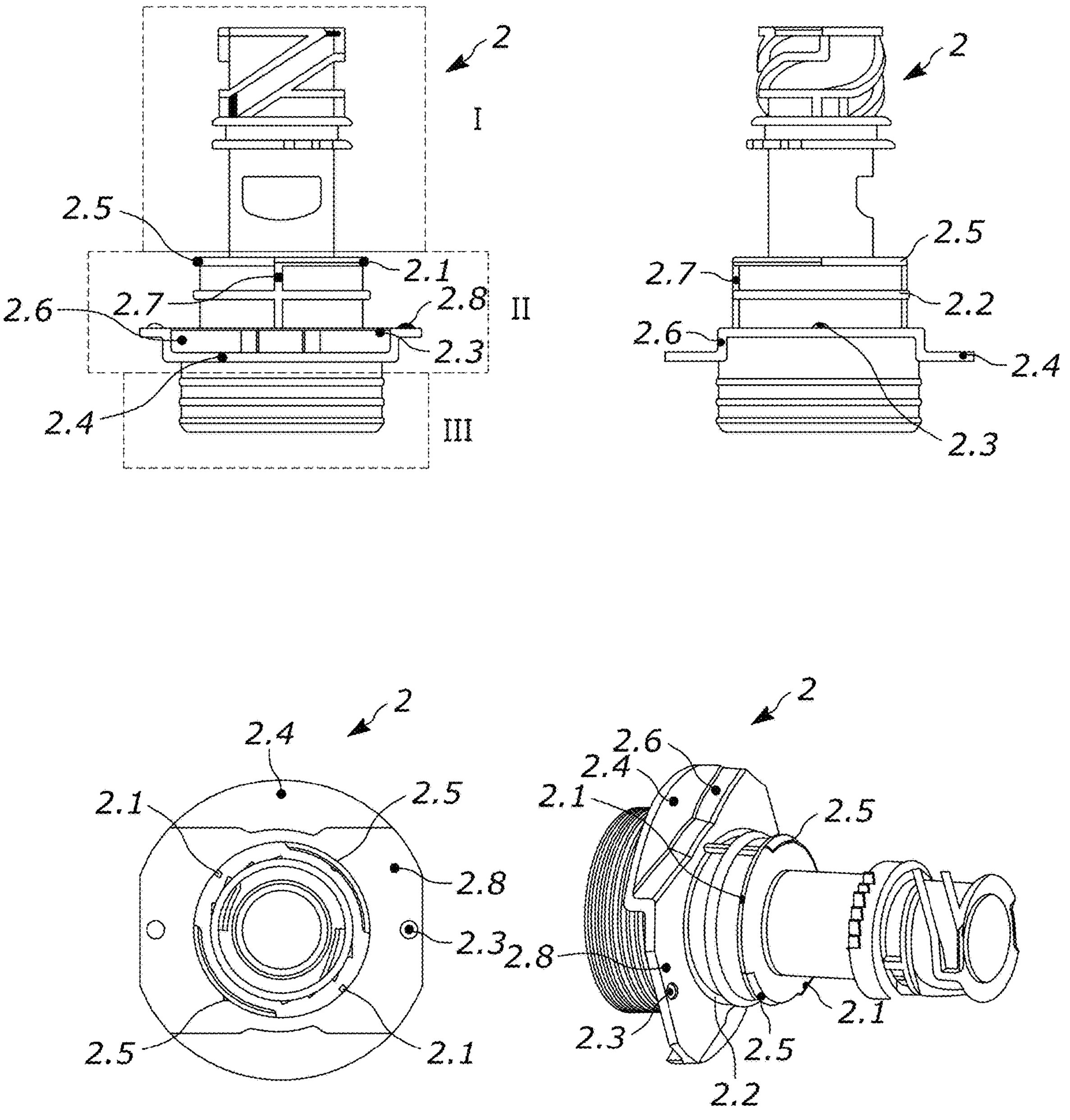
FIG. 20 is a front, side and isometric view of an embodiment of the body 2 of the tap 1 according to the present invention.

A second embodiment of the tap 1 of the invention is shown in FIG. 2, and instead uses a second locking ring LCKR 3B (shown in detail in FIG. 22) which is coupled with the new body 2 of FIG. 20 and with the cover visible in FIG. 12.

Both versions (tap 1 in FIG. 1 and tap 1 in FIG. 2) comply with the new European and international directives on disposable plastic items (SUP), as all components, including the new LCKR 3A and 3B locking rings, they remain permanently bound to the dispenser, not dispersing into the environment.

With reference to the Figures, and in particular to FIG. 11, the tap 1 of the present invention is formed, in its manual locking configuration on the box, first of all of known or optional components, such as:

- a closing/opening cap 4 guided by a cam system which is the component that, coupled with the body 2 of FIG. 14, allows the delivery or not of the flow; the technical characteristics of this cap 4 have been described in patent WO-A1-2006030465;
- a main support and containment body 2, shown in FIG. 20, equipped with an elongated neck I, partially threaded, whose technical characteristics have also been described in patent WO-A1-2006030465; and
- a cap 5, which is an optional additional component that allows to minimize the opening effort of the tap 1, by exploiting the large fins with which it is equipped.

The body 2, to be operatively coupled with the inventive locking ring LCKR 3A, 3B, is also equipped with a second central part II, connected to the elongated neck I, in which there is a group of geometries, which allow anchoring and correctly handling the locking ring LCKR 3A, 3B itself. There are two 2.1 opposing anchoring sectors, each 90° wide, where the geometries 2.1 necessary for anchoring the LCKR 3A and 3B locking ring are obtained. Always on the same ring, there are two remaining 2.5 opposing sectors, always 90° wide, which, having a less pronounced anchoring tooth than the first two sectors 2.1, favor the assembly of the locking ring LCKR 3A, 3B, allowing the passage of the anchoring teeth in sectors 3A.1 and 3B.1 at 90° present on the locking ring LCKR 3A, 3B of FIGS. 21 and 22. Also in the second central part II there is a central rib 2.2 (FIG. 20) which has the purpose of keeping the locking ring LCKR 3A, 3B in the correct position, favoring its correct rotation by 90° when it must be anchored to the box 7 of FIG. 28 on its internal flap 7B.

On the cylinder of the second central part II, there is also a geometry with a vertical rib 2.7 (FIG. 20) which, by cooperating with the internal tooth of the locking ring LCKR 3A, 3B, generates a "stop" area so that that the locking ring LCKR 3A, 3B stops in the correct anchoring position after a 90° rotation.

At the base of the cylinder of the second central part II, there is a foreground 2.8 (FIG. 20) which has the same geometry as the hole 7A (FIG. 27) to be created on the box 7, so that the tap 1, during its insertion, can easily pass the hole 7A and be placed in the box 7, allowing the underlying geometries 2.6 to anchor to the horizontal walls of the hole 7A.1, and therefore create that geometrical contrast necessary to compensate for the torque that is created when the dispensing tap 1 is opened and/or closed.

Figure 3:
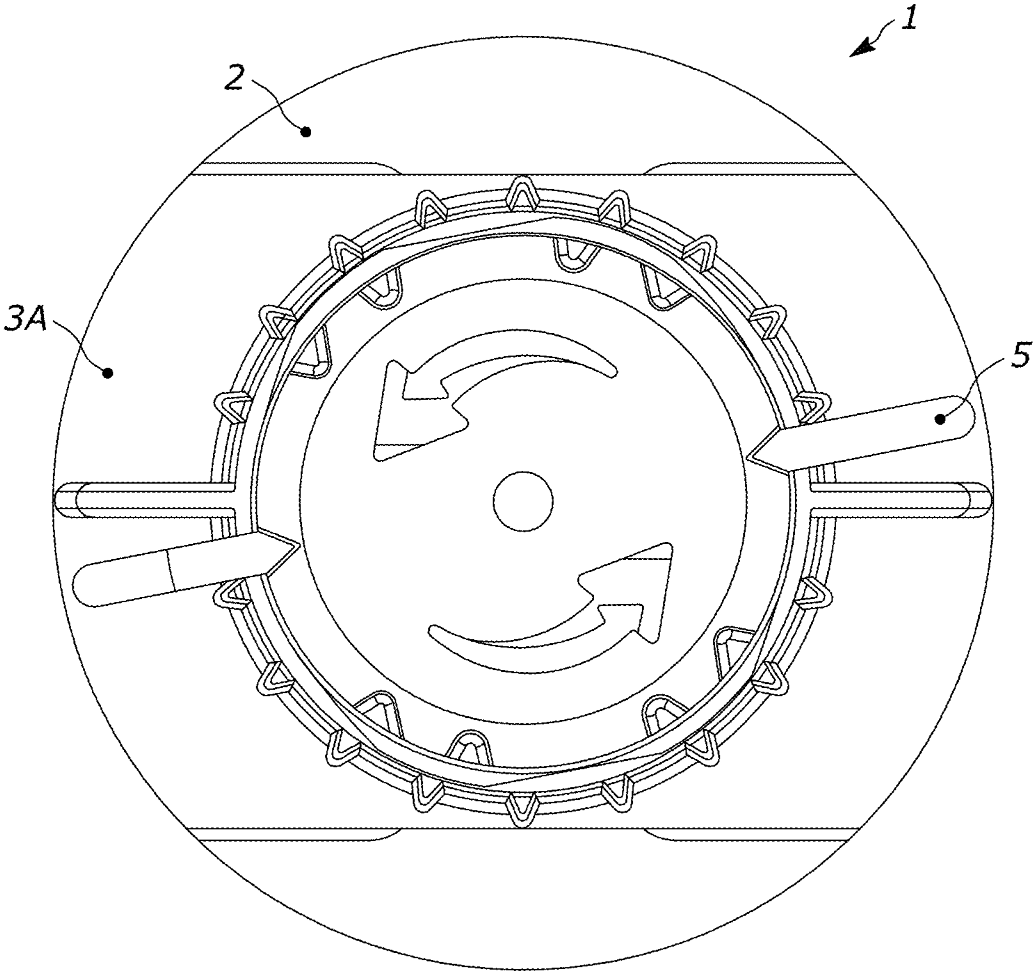
FIG. 3 is a front view of an embodiment of the tap 1 according to the present invention in the closed position with the locking ring LCKR 3A for use on manual lines "not activated"
Figure 4:
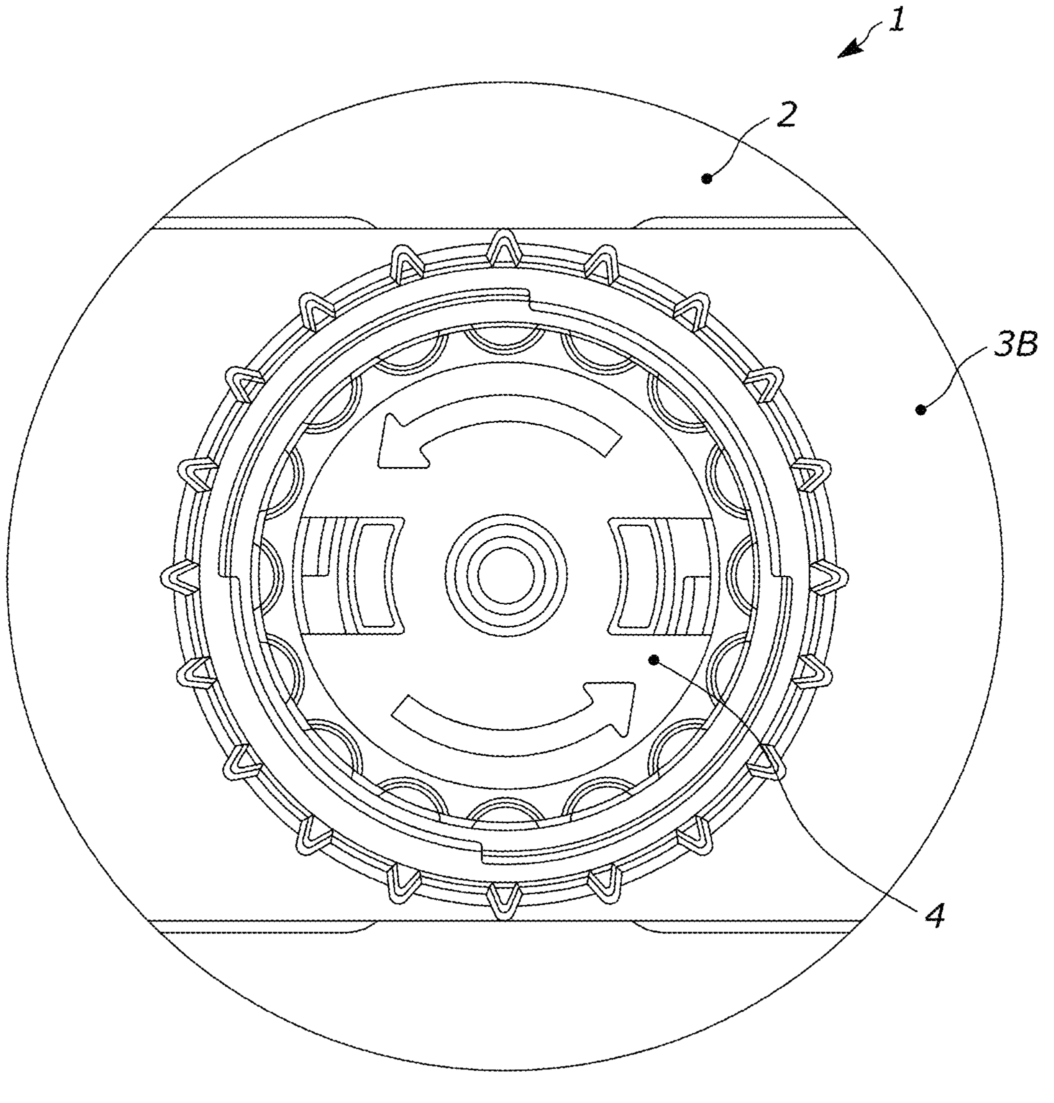
FIG. 4 is a front view of an embodiment of the tap 1 according to the present invention in the closed position with the locking ring LCKR 3B for use on automatic lines "not activated"
Figure 5:
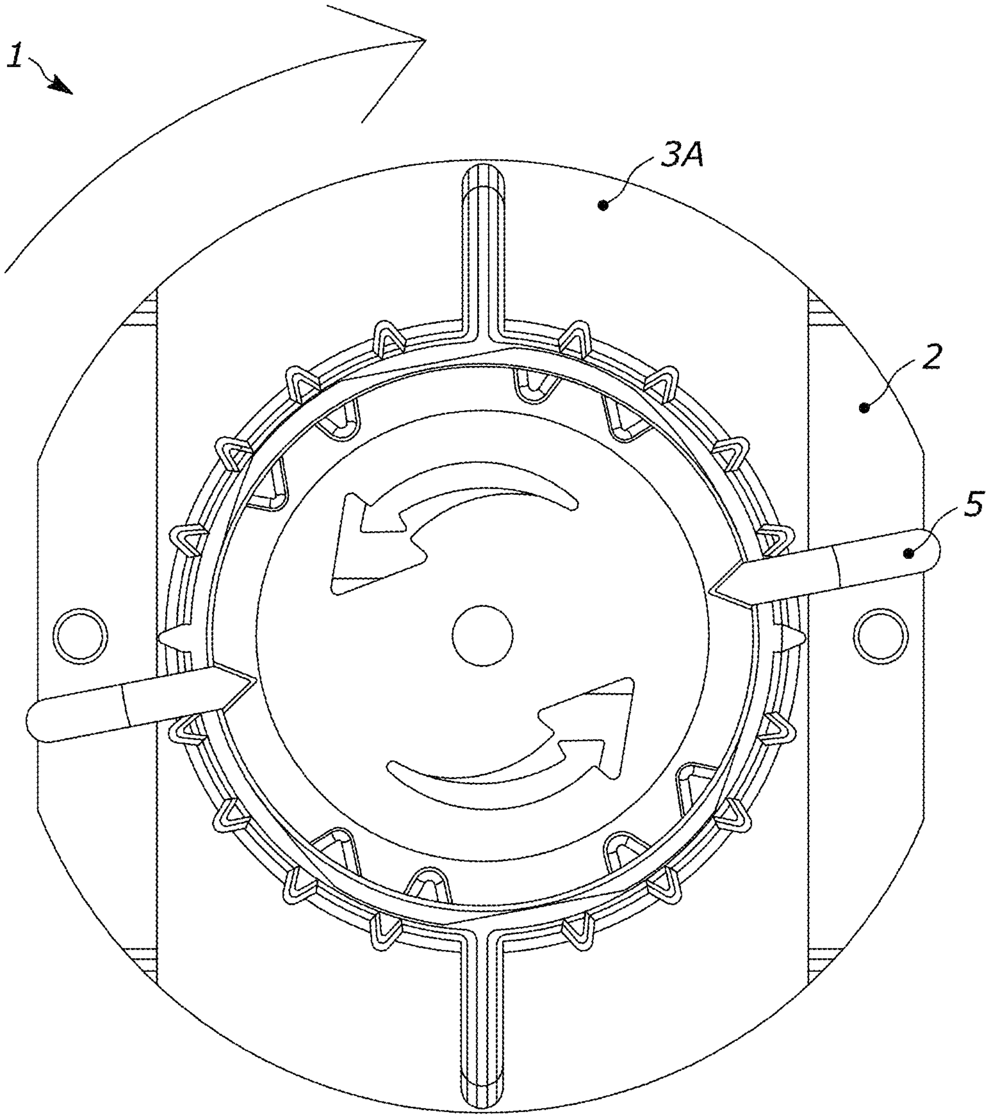
FIG. 5 is a front view of an embodiment of the tap 1 according to the present invention in the closed position with the locking ring LCKR 3A for use on manual lines "activated"
Figure 6:
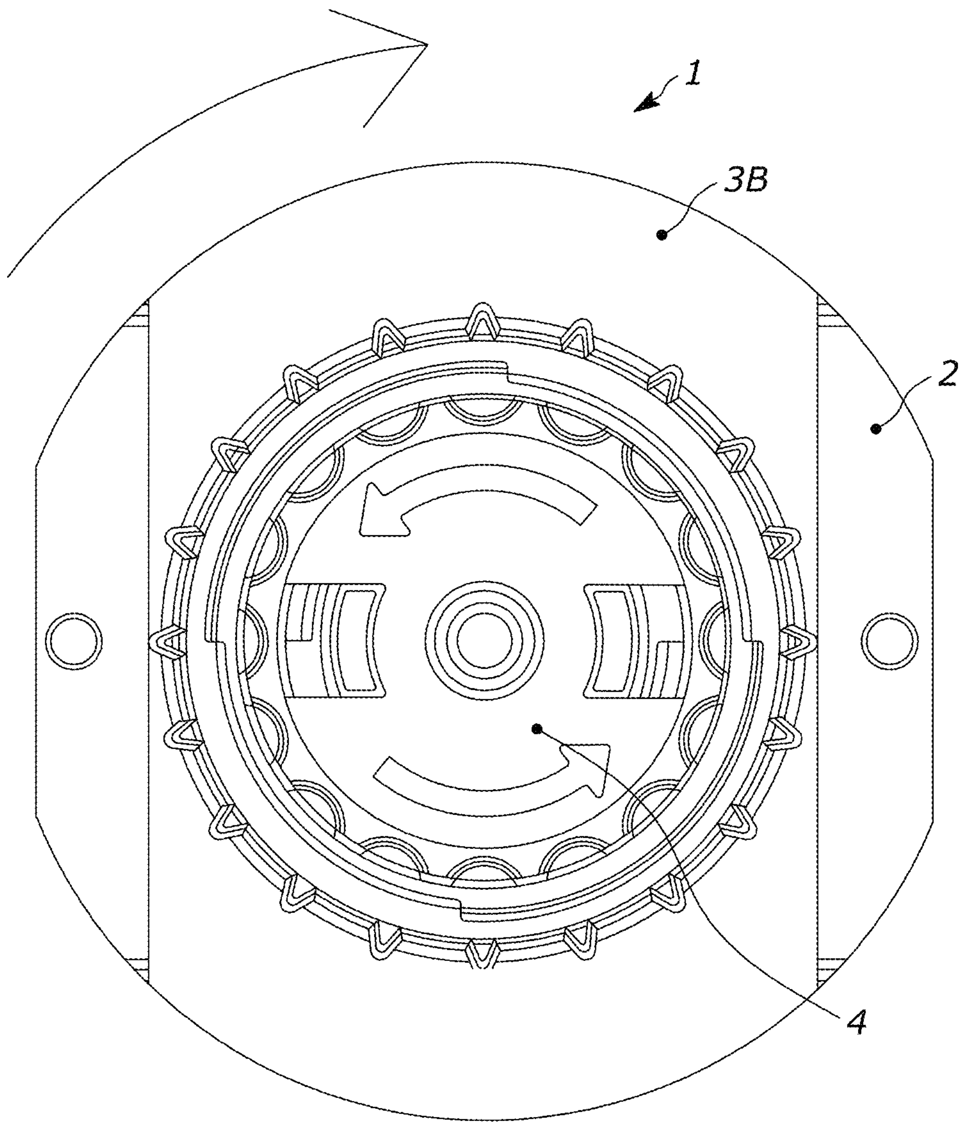
FIG. 6 is a front view of an embodiment of the tap 1 according to the present invention in the closed position with the locking ring LCKR 3B for use on automatic lines "activated"
Figure 7:
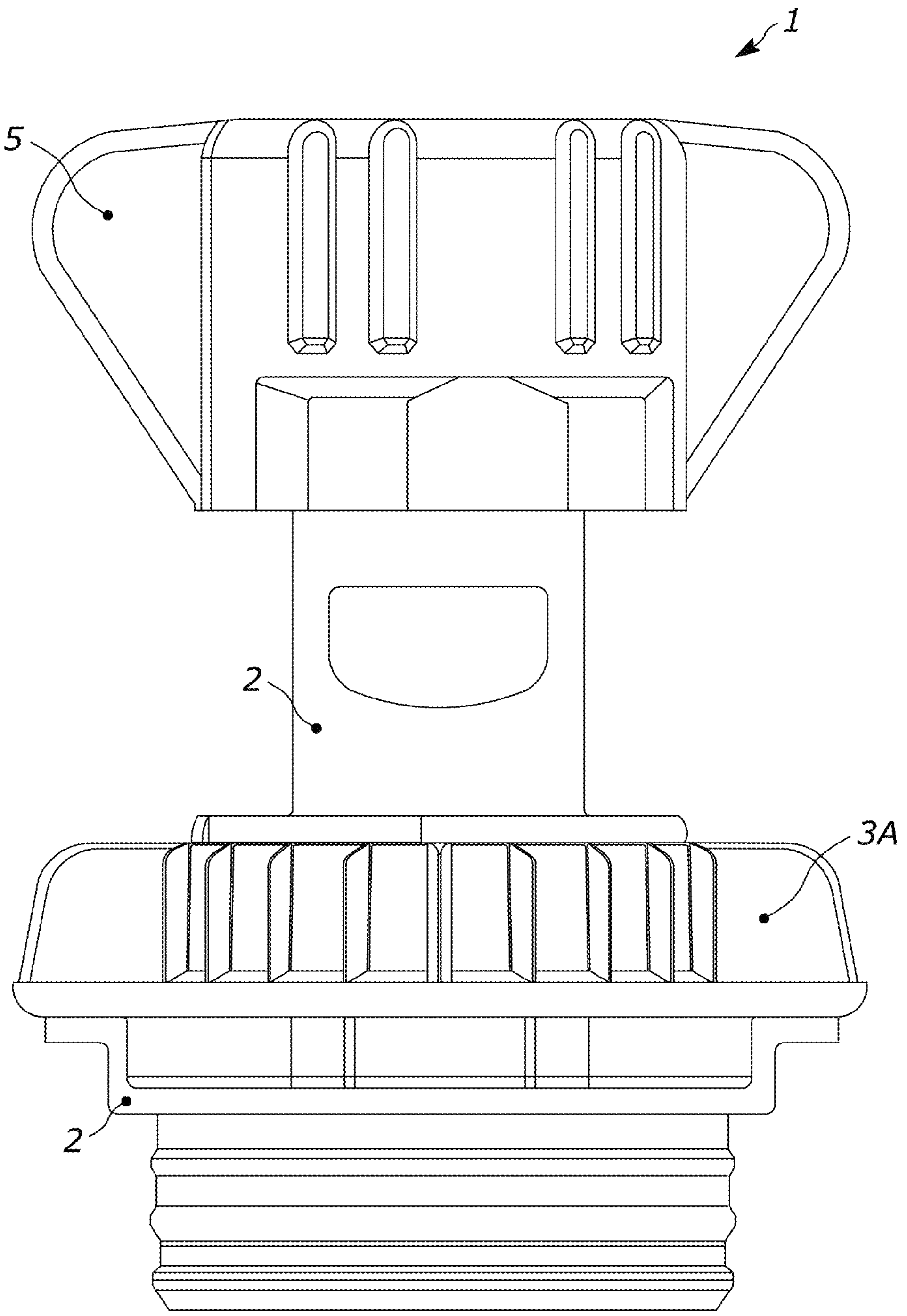
FIG. 7 is a front view of an embodiment (manual version) of the tap 1 assembled according to the present invention in the closed position with the locking ring LCKR 3A "not activated"
Figure 8:
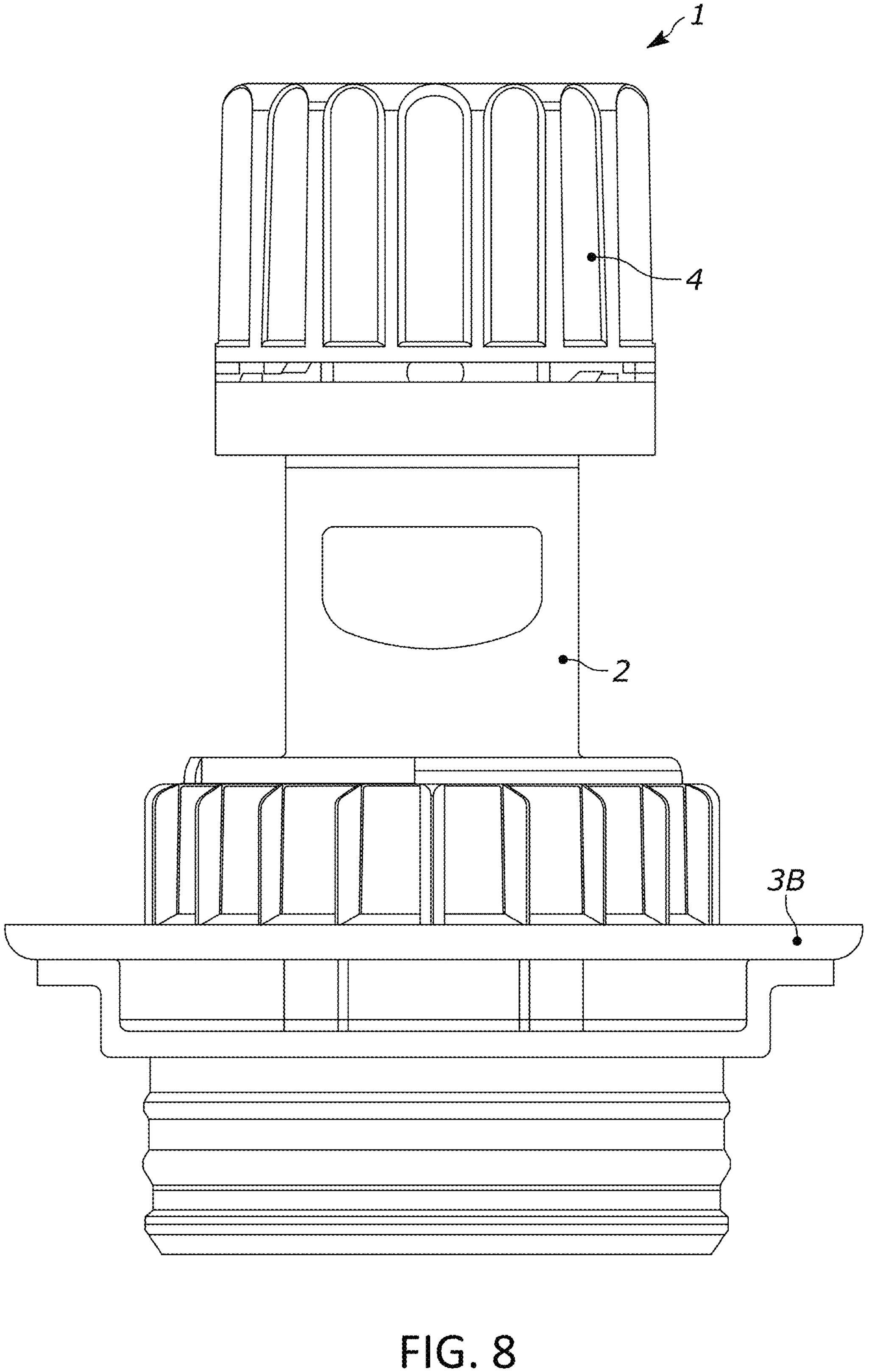
FIG. 8 is a front view of an embodiment (automatic version) of the tap 1 assembled according to the present invention in the closed position with the locking ring LCKR 3B "not activated"
Figure 9:
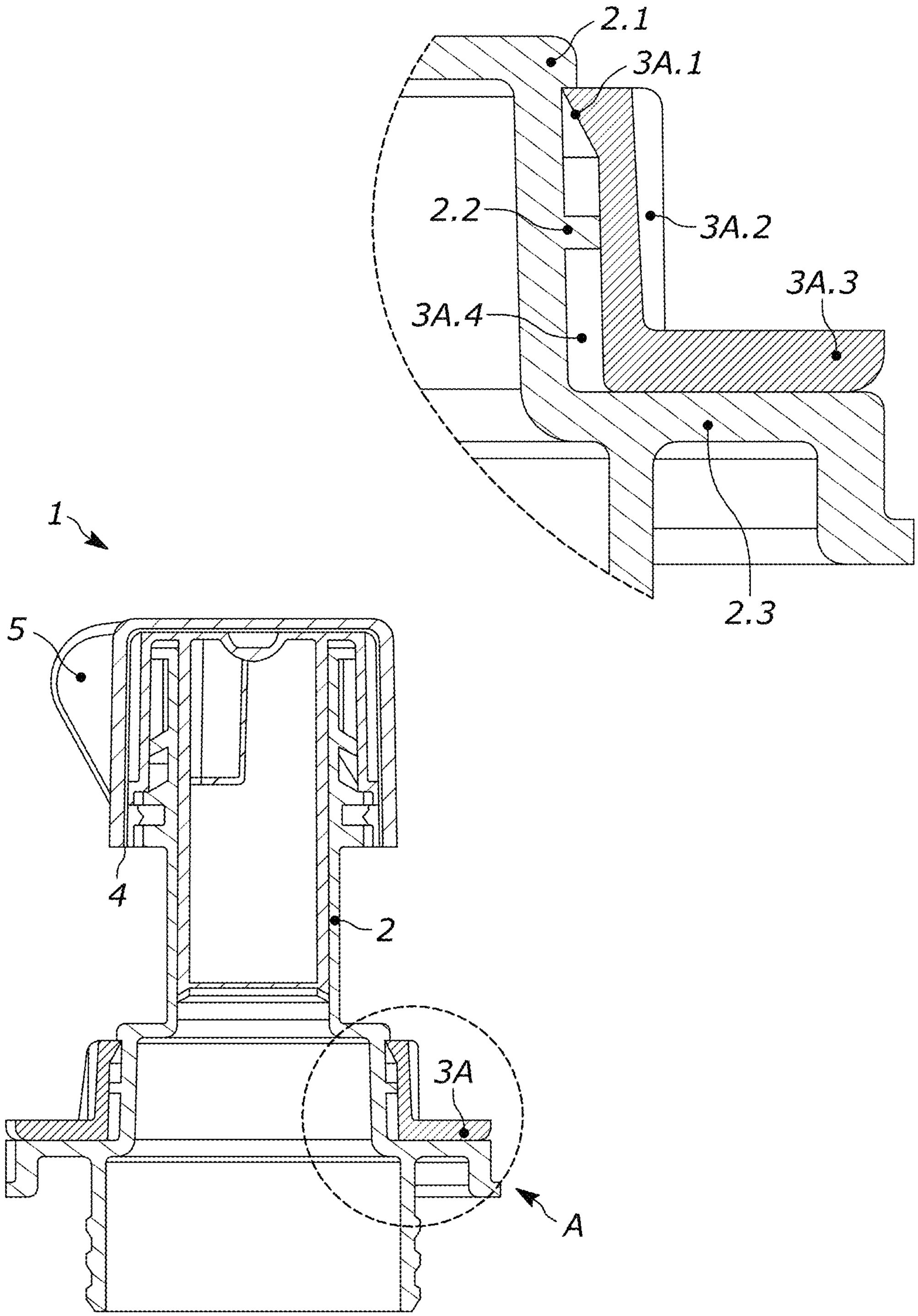
FIG. 9 is a sectional front and detailed view of an embodiment of the tap 1 according to the present invention in the closed position with the locking ring LCKR 3A (manual version) "not activated"
Figure 10:
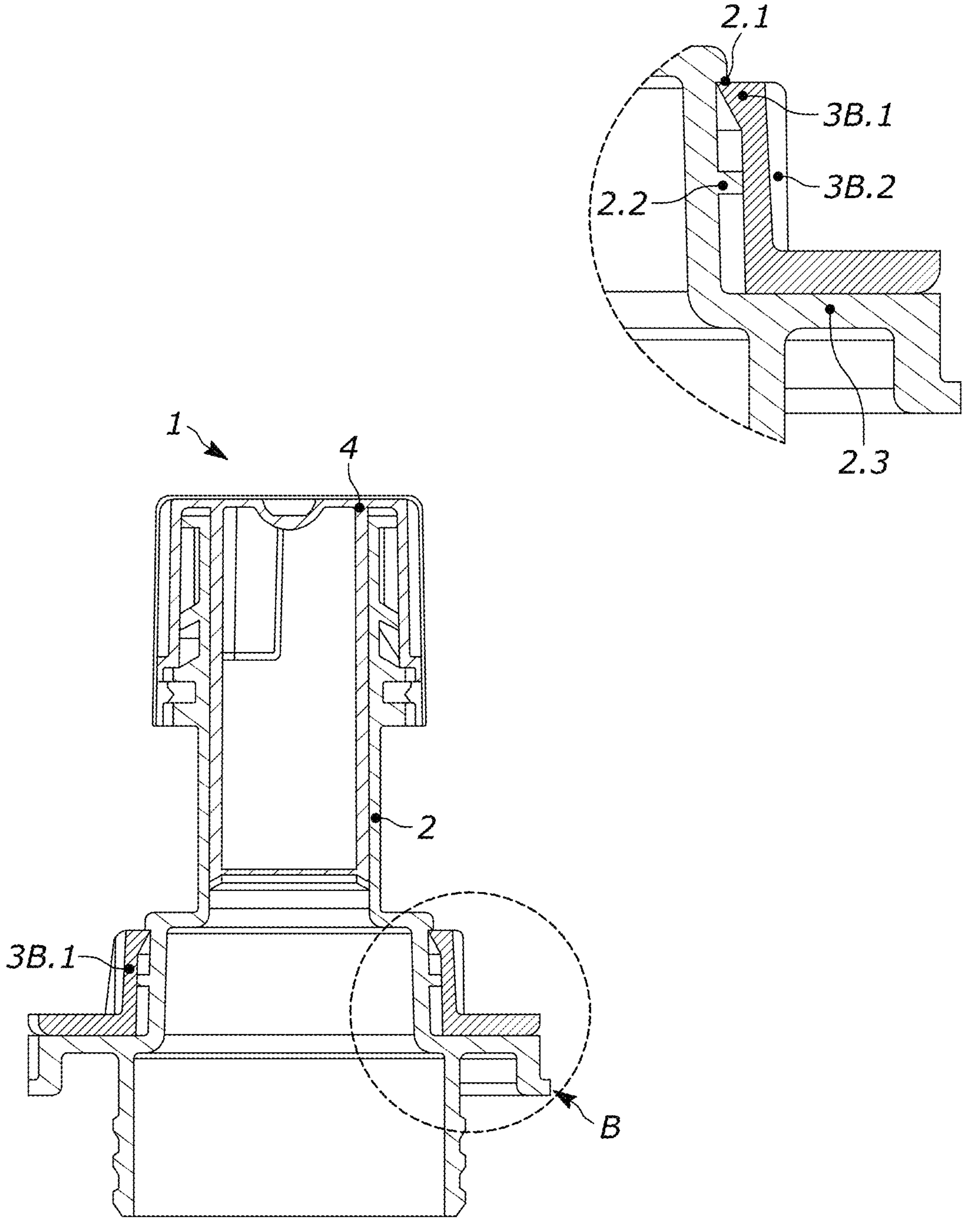
FIG. 10 is a sectional front and detailed view of an embodiment of the tap 1 according to the present invention in the closed position with the locking ring LCKR 3B (automatic version) "not activated"

Finally, there is a double contrast 2.4 (FIG. 20) which allows the tap 1 to rest on the internal side of the flap 7A and which allows, in cooperation with the locking ring LCKR 3A, 3B, to block definitively the tap 1, preventing it from coming out or collapsing inside the BIB 7 itself, thus creating a perfectly balanced system. On the plane 2.8 of FIG. 20, two opposite hemispherical geometries 2.3 are obtained, which are coupled with the hollow geometries obtained on the locking ring LCKR 3A, 3B in its rear part (3A.7 of FIGS. 21 and 3B.5 of FIG. 22), thereby preventing the locking ring LCKR 3A, 3B from moving in the steps preceding the final locking on the cardboard box 7.

The body 2 finally comprises a third base zone III, connected to the second central zone II, in which there are the geometries for connection to the nozzle welded on the inner bag of the BIB 7, which are already known and described in patent WO-A1-2006030465.

Figure 21:
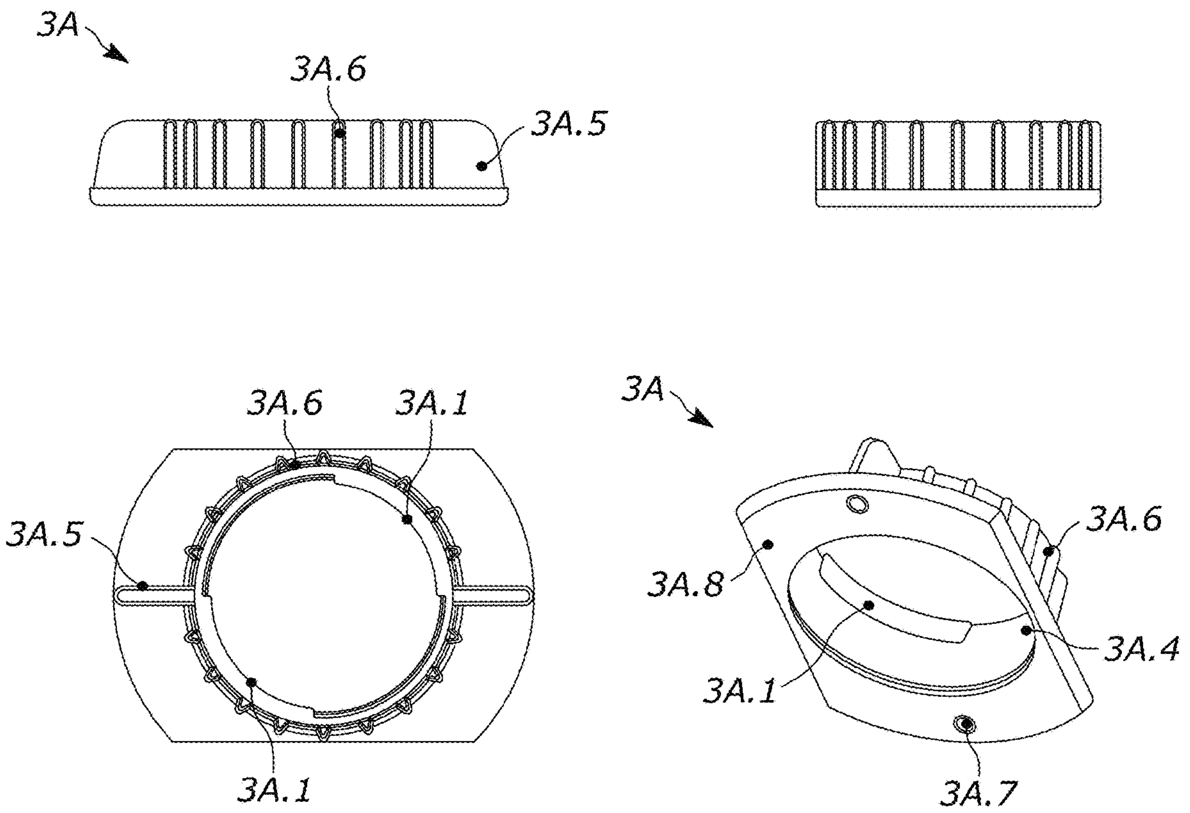
FIG. 21 is a front, side and isometric view of an embodiment of the locking ring LCKR 3A in the manual positioning version of the tap 1 according to the present invention.
Figure 23:
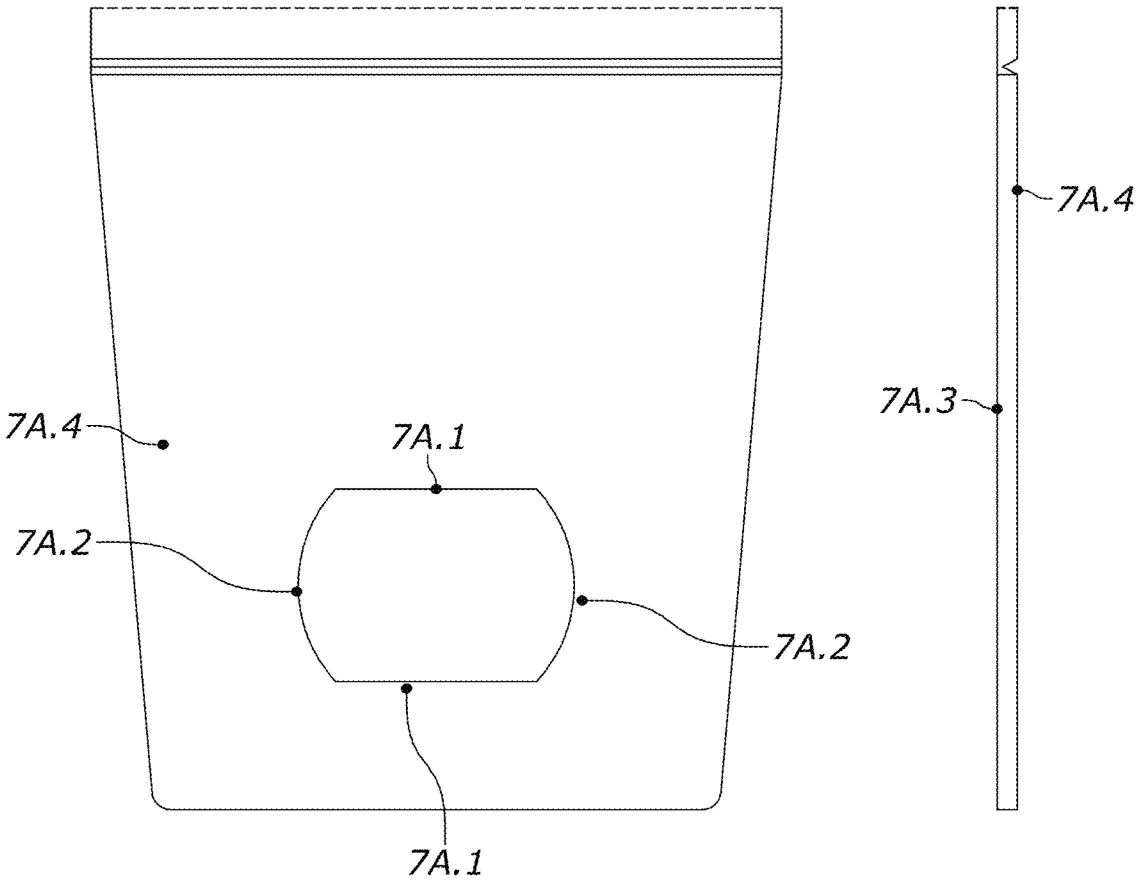
FIG. 23 is a front view of the geometry of the hole to be made on the box 7, with flap 7B, according to the present invention.

The tap 1 also comprises a locking ring LCKR 3A, 3B useful for placing the dispensing tap on the body 2 thanks to the geometries that are listed below. With reference to FIG. 21, in its manual version 3A, it is a component that has a flat shape identical to the through hole to be created on the box 7 of FIG. 23, and therefore allows the dispenser tap 1, when it is mounted and not in the hooking position, to easily pass the hole created on the internal flap 7A of the box 7 of FIG. 23.

From the flat area 3A.8 of FIG. 21 a cylinder 3A.4 develops itself and contains inside it the two opposed 90° coupling sectors 3A.1 which are then coupled with the profiles 2.1 present on the body 2 of FIG. 20. On the outside of the cylinder and for all 360° there are clamping sectors ("grip") 3A.6 to better facilitate the engagement of the fingers during the anchoring/rotation step of the locking ring LCKR 3A. For this 3A version, there are two opposing fins 3A.5 which further increase the grip area useful for the operator carrying out the manual assembly. On the lower part of the locking ring LCKR 3A there are two opposing spherical grooves which act as a seat for the opposite hemispherical geometries 2.3 present on the body 2.

Figure 22:
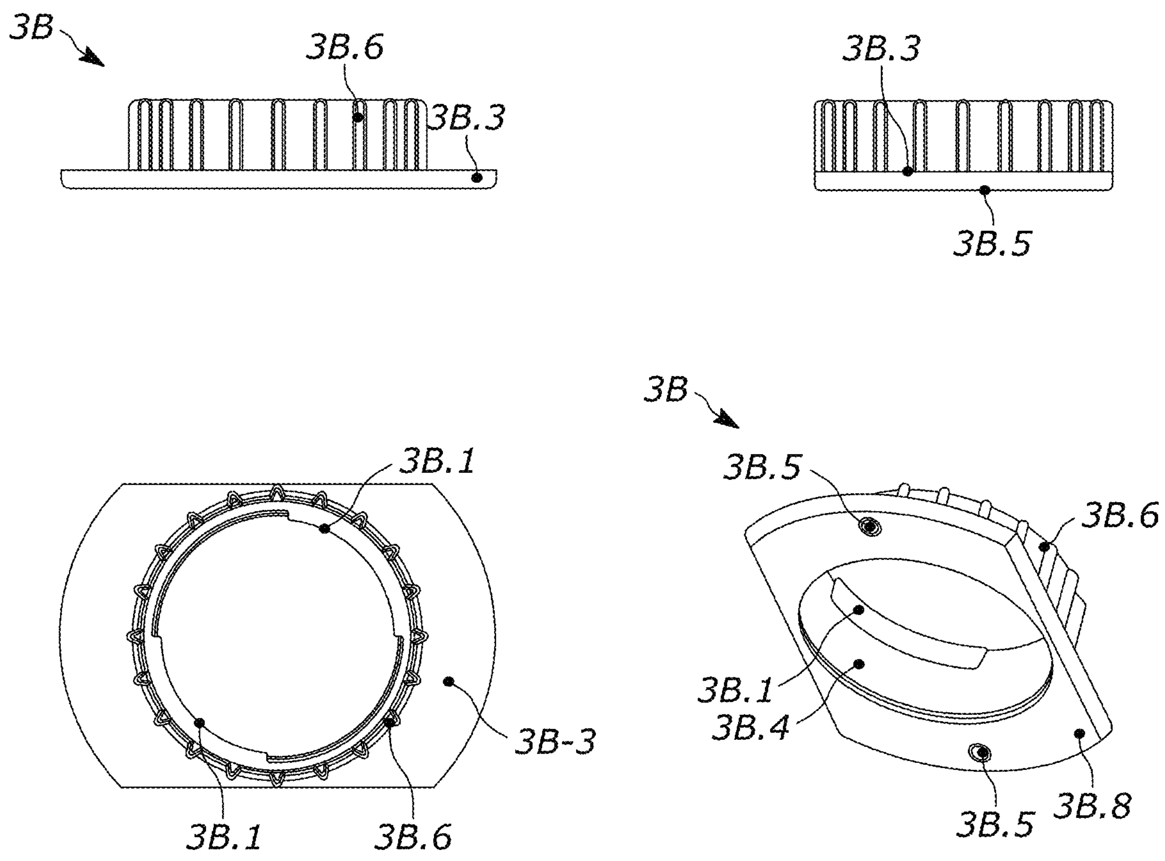
FIG. 22 is a front, side and isometric view of an embodiment of the locking ring LCKR 3B in the manual positioning version of the tap 1 according to the present invention.

As an alternative to the manual version, it is possible to use a locking ring LCKR 3B (shown in detail in FIG. 22) useful for placing the dispenser tap 1 on the body 2 thanks to the geometries that are listed below. With reference to FIG. 22, the locking ring LCKR 3B is a component that has a shape, in plane, identical to the through-hole created on the box 7, and therefore allows the dispensing tap 1, when it is mounted and not in its coupling position, to easily pass the hole created on the inner flap 7A of the box 7.

Figure 19:
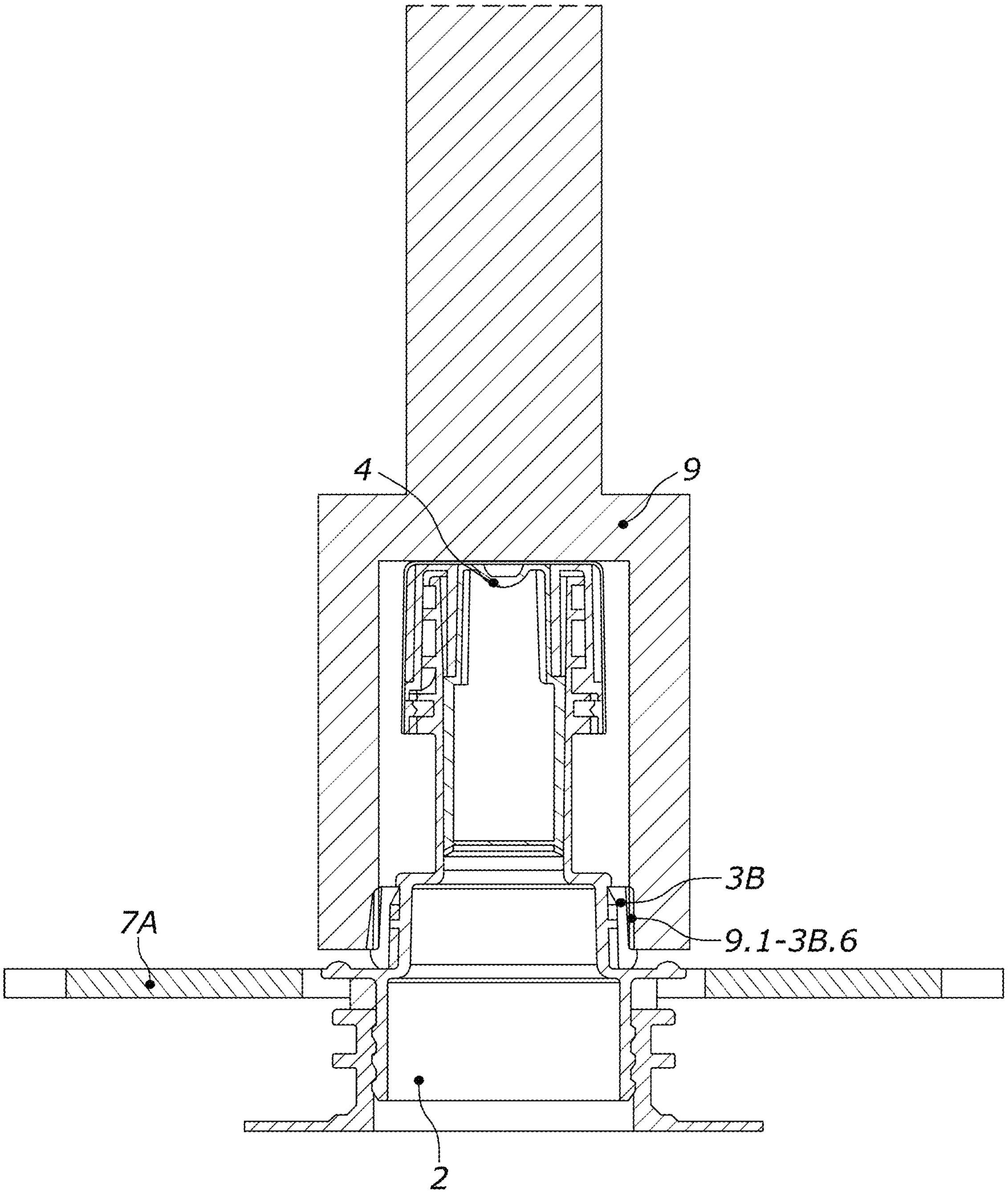
FIG. 19 is a sectional front view of an embodiment of the tap 1 and the mandrel which proceeds with the movement (in rotation) of the locking ring LCKR 3B automatically locking it on the carton 7B of the box 7 according to the present invention.

From the flat area 3B.8 of FIG. 22 a cylinder 3B.4 develops itself and contains inside it the two coupling sectors 3B.1 opposite each other at 90°, which are then coupled with the profiles 2.1 present on the body 2 of FIG. 20. On the outside of the cylinder and for all 360° there are grip sectors 3B.6 to better facilitate the engagement of the fingers during the anchoring/rotation step of the locking ring LCKR 3B. As shown in FIG. 19, the external geometries 3B.6 can be operatively coupled with a mandrel 9 of FIG. 19 which allows the locking ring LCKR 3B to be automatically rotated once the cap has been placed on the box 7. The mandrel inside it has hollow geometries opposite to the geometries 3B.6 obtained on the locking ring LCKR 3B, which allow it to have the necessary grip to make the locking ring LCKR 3B perform the necessary 90° rotation to lock the system to the box. On the lower part of the locking ring LCKR 3B, there are two opposing spherical grooves that act as a seat for the 2.3 opposite geometries present on the body 2.

Figure 17:
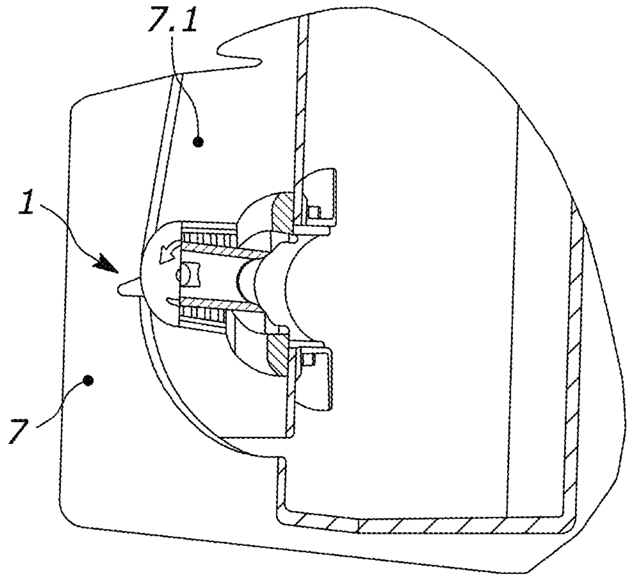
FIG. 17 is an isometric, sectional and side sectional view of an embodiment of the tap 1 placed and locked on the box 7 and in a ready-to-use position for dispensing according to the present invention in conformation for manual lines.
Figure 17:
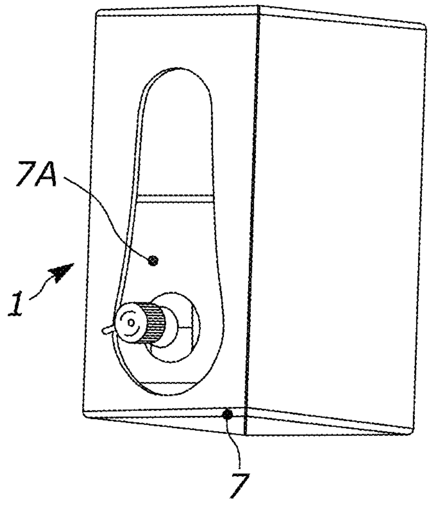
Figure 17:
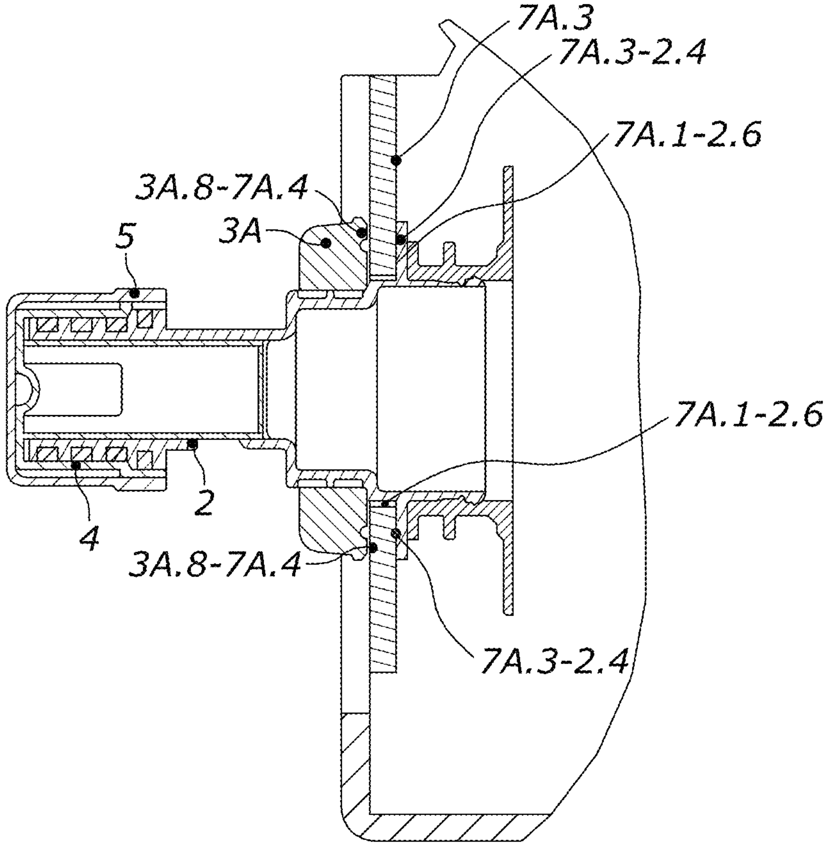
Figure 18:
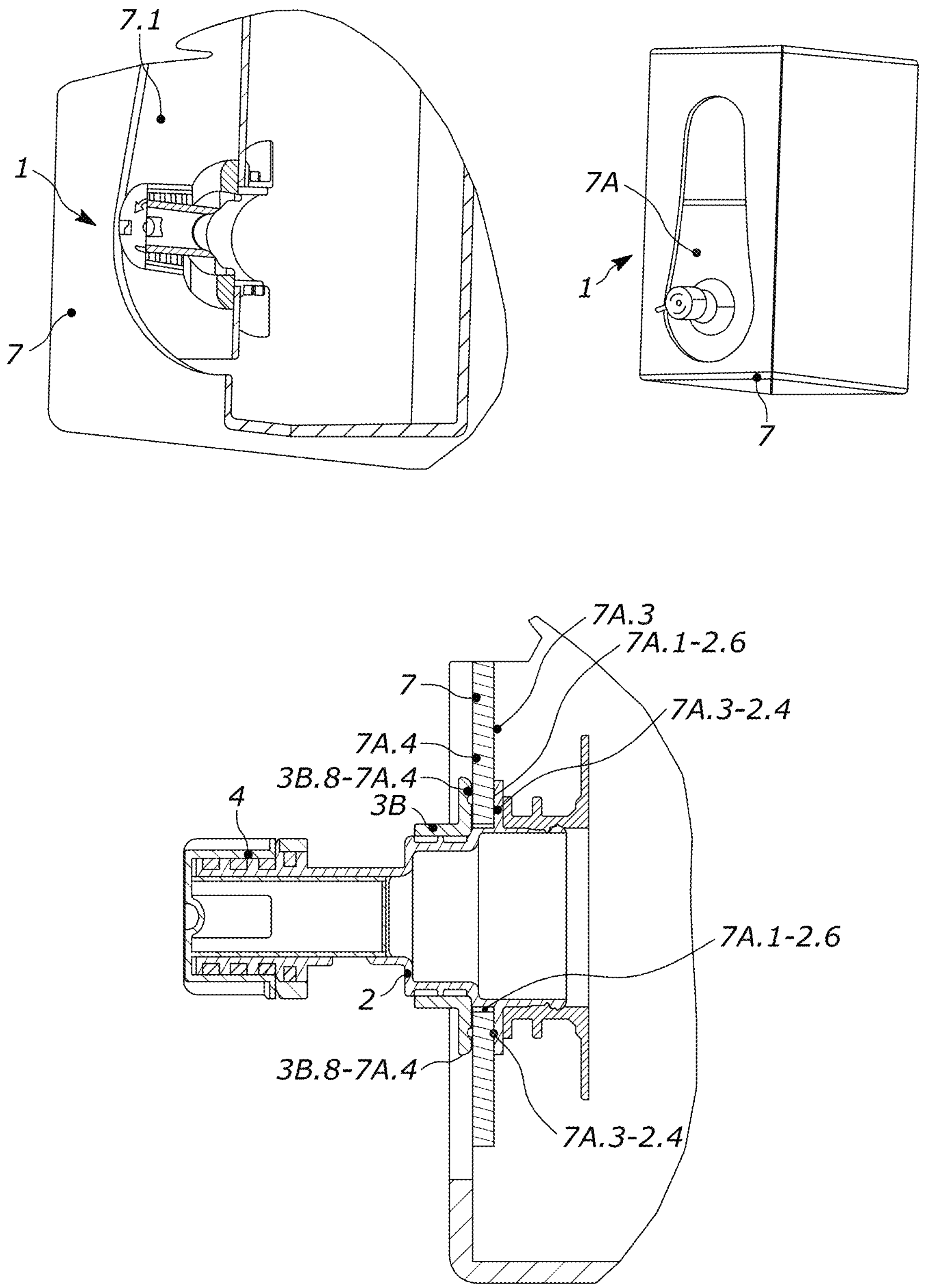
FIG. 18 is an isometric, sectional and side sectional view of an embodiment of the tap 1 placed and locked on the box 7 and in a ready-to-use position for dispensing according to the present invention in conformation for automatic lines.

Going in detail and referring to FIG. 17 (as regards the manual version of the locking ring LCKR 3A) and FIG. 18 (as regards the automatic version of the locking ring LCKR 3B), we will now describe the dispenser tap assembly 1 in its use position.

Analyzing FIG. 17, once the tap 1 has been inserted into the hole created on the flap 7A and once the locking ring LCKR 3A, 3B has been rotated by 90°, the assembly is locked to the cardboard box 7. Going to analyze the geometries involved in the perfect locking of the tap 1 on the box 7, it can be observed that the horizontal planes 2.6 of FIG. 20 are operatively coupled with the horizontal planes 7A.1 of FIG. 23, thereby counteracting the opening torque and closing the dispenser tap 1. To prevent the tap 1 from going beyond the hole, the plane geometry 2.4 of FIG. 20 abuts against the internal surface 7A.3 of the flap of the cardboard box of FIG. 23, thus not allowing the cap to overcome the hole but to maintain a given height that allows the locking ring LCKR 3A, 3B to rotate and lock the front part 7A4 on the rear part 3A.8 of the locking ring LCKR 3A, thus preventing the collapsing cap inside the BIB 7.

Analyzing FIG. 18, once the tap 1 has been inserted into the hole created on the flap 7A and once the locking ring LCKR 3A, 3B has been rotated by 90°, the assembly is locked to the cardboard box 7. Going to analyze the geometries involved in the perfect locking of the tap 1 on the box 7, it can be observed that the horizontal planes 2.6 of FIG. 20 are operatively coupled with the horizontal planes 7A.1 of FIG. 23, thereby counteracting the opening torque and closing the dispenser tap 1. To prevent the tap 1 from going beyond the hole, the plane geometry 2.4 of FIG. 20 abuts against the internal plane of the flap 7A.3 of the cardboard box 7 of FIG. 23, thus not allowing the cap to overcome the hole but to maintain a given height which allows the locking ring LCKR 3A, 3B to rotate and lock the front part 7A4 of FIG. 23 on the rear part 3B.8 of the locking ring LCKR 3B of FIG. 21, thereby allowing the cap to collapse inside the BIB 7.

In order to comply with the new European and international directives on disposable plastic items (SUP), it is possible, at the end of the life of the BIB 7, to rotate the locking ring LCKR 3A, 3B in the opposite direction in order to be able to easily release the part made of plastic (therefore internal plastic bag+dispenser with integrated locking ring) from the cardboard part (box), that can therefore be recycled easily and correctly.

It will also be possible to create on the locking ring geometries for hooking the dosing cup (not shown).

The invention claimed is:

1. A dispenser tap comprising:

a support and a containment body equipped with an elongated neck;

a Locking ring (LCKR) placed externally around the elongated neck of the containment body designed to be anchored to a cardboard box and rotatable by 90° in order to perform a locking of the dispenser tap with the cardboard box; and a first cap inserted inside the elongated neck of the containment body;

wherein the containment body further comprises:

a second central zone, connected to the elongated neck, designed to operatively couple with the Locking ring (LCKR); and a third base zone, connected to the second central zone, in which external connection geometries of the dispenser tap are located;

wherein, in the second central zone, there are two opposing anchoring sectors, each 90° wide, where geometries of the two opposing anchoring sectors necessary for anchoring the Locking ring (LCKR) are obtained, on a same ring there being two remaining opposing sectors, always 90° wide, which, having a less pronounced anchoring tooth than a first two sectors, enable an assembly of the Locking ring (LCKR), allowing a passage of an anchoring teeth in coupling sectors placed at 90° on the Locking ring (LCKR), the second central zone further comprising a central rib which has a purpose of keeping the Locking ring (LCKR) in a correct position, favoring a correct 90° rotation of the Locking ring (LCKR) during an operative anchoring step, the second central zone comprising also a vertical rib geometry designed to cooperate with an internal tooth of the Locking ring (LCKR) and generate a stop area of the Locking ring (LCKR), the second central zone also including a first plane, the first plane allowing underlying horizontal planes to be anchored to the cardboard box, the second central zone also including a double contrast which allows the dispenser tap to lean on a flap the cardboard box and, in cooperation with the Locking ring (LCKR), definitively lock the dispenser tap, preventing the dispenser tap from coming out of an anchored position or collapsing.

2. The dispenser tap of claim 1, further comprising a second cap placed above a part of the first cap protruding from the elongated neck of the containment body, the second cap being designed to minimize an effort to open the dispenser tap by exploiting large fins with which the second cap is equipped.

3. The dispenser tap of claim 1, wherein, on the first plane, there are two opposing semicircular geometries which are coupled with hollow geometries obtained on the Locking ring (LCKR) in a rear part, thus preventing the Locking ring (LCKR) from moving in steps preceding a final anchoring step on the cardboard box.

4. The dispenser tap of claim 1, wherein the Locking ring (LCKR) in a manual version is designed to allow an assembly of the dispenser tap, and comprises, in development from a flat rear area, a cylinder which contains inside two opposed 90° coupling sectors which are then coupled with the geometries of the two opposing anchoring sectors present on the containment body, and clamping sectors extending 360° around an outside of the cylinder to better facilitate an engagement of fingers during an anchoring/rotation step of the Locking ring (LCKR), the Locking ring (LCKR) also comprising two opposing fins which further increase a grip area useful for an operator carrying out a manual assembly, on a lower part of the Locking ring (LCKR) being present two opposed spherical grooves which act as a seat for opposite semicircular geometries present on the containment body.

5. The dispenser tap of claim 1, wherein the Locking ring (LCKR) in an automatic version is designed to allow a fitting of the dispenser tap, and comprises, in development from a flat area, a cylinder which contains inside the two coupling sectors opposite to each other by 90°, which are then coupled with the geometries of the two opposing anchoring sectors present on the containment body, there being grip sectors extending 360° around the outside of the cylinder to better facilitate an engagement of fingers during an anchoring/rotation step of the Locking ring (LCKR), external geometries being suitable for operatively coupling with a mandrel designed to automatically rotate the Locking ring (LCKR) once the first cap is placed in an operative position, the mandrel having inside hollow geometries opposite to geometries obtained on the Locking ring (LCKR), which allow to have a necessary grip to make the Locking ring (LCKR) perform a necessary 90° rotation to lock the dispenser tap in the anchored position, on a lower part of the Locking ring (LCKR) there being two opposing spherical grooves which act as a seat for opposite semicircular geometries present on the containment body.

* * * * *